United States Patent
Wang et al.

(10) Patent No.: US 10,382,438 B2
(45) Date of Patent: Aug. 13, 2019

(54) METHOD AND APPARATUS FOR EXPANDED CONTENT TAG SHARING

(75) Inventors: Hao Wang, Beijing (CN); Kun Yu, Randwick (AU); Wendong Wang, Beijing (CN); Yidong Cui, Beijing (CN); Aki Petri Happonen, Kiiminki (FI); Hannu Vilpponen, Järvenpää (FI); Matti Aleksi Malmstedt, Tampere (FI); Henrik Stefan Markus Hakala, Tampere (FI)

(73) Assignee: Nokia Technologies Oy, Espoo (FI)

( * ) Notice: Subject to any disclaimer, the term of this patent is extended or adjusted under 35 U.S.C. 154(b) by 901 days.

(21) Appl. No.: 13/699,261

(22) PCT Filed: May 27, 2010

(86) PCT No.: PCT/CN2010/073295
§ 371 (c)(1),
(2), (4) Date: Sep. 5, 2014

(87) PCT Pub. No.: WO2011/147089
PCT Pub. Date: Dec. 1, 2011

(65) Prior Publication Data
US 2014/0380420 A1    Dec. 25, 2014

(51) Int. Cl.
*H04L 29/06* (2006.01)
*G06Q 10/10* (2012.01)
(Continued)

(52) U.S. Cl.
CPC ............ *H04L 63/10* (2013.01); *G06F 16/51* (2019.01); *G06F 16/5866* (2019.01); *G06F 21/62* (2013.01); *G06Q 10/10* (2013.01)

(58) Field of Classification Search
None
See application file for complete search history.

(56) References Cited

U.S. PATENT DOCUMENTS

| 7,258,614 B1 | 8/2007 | Kates et al. |
| 7,379,549 B2 | 5/2008 | Pelly et al. |
(Continued)

FOREIGN PATENT DOCUMENTS

| CN | 101127870 A | 2/2008 |
| CN | 101340464 A | 1/2009 |
(Continued)

OTHER PUBLICATIONS

Office action received for corresponding Chinese Patent Application No. 201080066916.7, dated Jul. 27, 2015, 3 pages of office action and 3 pages of office action translation available.
(Continued)

*Primary Examiner* — Farid Homayounmehr
*Assistant Examiner* — Olanrewaju J. Bucknor
(74) *Attorney, Agent, or Firm* — Ditthavong & Steiner, P.C.

(57) ABSTRACT

Techniques for expanded content tag sharing include determining that a first user is associated with content provided by a different second user. Data is recorded that indicates the first user is authorized to associate a different third user with the content provided by the second user, without further input by the second user. In some embodiments, the data that indicates the content provided by the second user includes data that indicates a plurality of contents. Some techniques include determining a message received from a first user indicates a portion of content associated with the first user, and a second user. The portion of the content is rendered on an apparatus of the second user. The second user is prompted for associating, with the portion of the content, an item identifier, such as text or another user, for the portion of the content.

19 Claims, 16 Drawing Sheets

(51) Int. Cl.
*G06F 21/62* (2013.01)
*G06F 16/51* (2019.01)
*G06F 16/58* (2019.01)

(56) References Cited

U.S. PATENT DOCUMENTS

| | | | |
|---|---|---|---|
| 7,756,945 B1* | 7/2010 | Andreessen | G06F 17/30607 709/203 |
| 7,933,972 B1* | 4/2011 | Issa | G06F 17/3028 707/781 |
| 2005/0198305 A1* | 9/2005 | Pezaris | H04L 12/585 709/227 |
| 2005/0289558 A1 | 12/2005 | Illowsky et al. | |
| 2006/0021065 A1 | 1/2006 | Kamperman et al. | |
| 2006/0242178 A1 | 10/2006 | Butterfield et al. | |
| 2007/0130010 A1* | 6/2007 | Pokonosky | G06Q 30/02 705/14.64 |
| 2008/0091723 A1 | 4/2008 | Zuckerberg et al. | |
| 2008/0109881 A1* | 5/2008 | Dasdan | G06F 17/30876 726/4 |
| 2008/0162557 A1 | 7/2008 | Boda et al. | |
| 2008/0189336 A1 | 8/2008 | Prihodko | |
| 2008/0194270 A1* | 8/2008 | Greenberg | G06F 17/30265 455/456.1 |
| 2008/0288499 A1 | 11/2008 | Choi et al. | |
| 2009/0077124 A1* | 3/2009 | Spivack | G06Q 30/02 |
| 2009/0187825 A1 | 7/2009 | Sandquist et al. | |
| 2009/0316961 A1 | 12/2009 | Gomez Suarez et al. | |
| 2010/0057555 A1* | 3/2010 | Butterfield | G06F 17/30038 705/14.41 |
| 2011/0131180 A1* | 6/2011 | Tuli | G06Q 10/10 707/610 |
| 2011/0182482 A1* | 7/2011 | Winters | G06F 17/30256 382/116 |

FOREIGN PATENT DOCUMENTS

| | | |
|---|---|---|
| EP | 2103124 A2 | 9/2009 |
| JP | 2005-269399 A | 9/2005 |
| JP | 2010-518505 A | 5/2010 |
| WO | 2008/097049 A1 | 8/2008 |
| WO | 2008/097052 A1 | 8/2008 |
| WO | 2009/060323 A1 | 5/2009 |
| WO | 2009/156184 A1 | 12/2009 |

OTHER PUBLICATIONS

International Search Report and Written Opinion received for corresponding Patent Cooperation Treaty Application No. PCT/CN2010/073295, dated Mar. 10, 2011, 9 pages.

Office action received for corresponding Japanese Patent Application No. 2013-511501, dated Nov. 1, 2013, 3 pages of office action, No English Language Translation available.

Extended European Search Report received for corresponding European Patent Application No. 10851961.2, dated Apr. 8, 2014, 7 pages.

Choi et al., "Face Annotation for Personal Photos Using Collaborative Face Recognition in Online Social Networks", 16th International Conference on Digital Signal Processing, Jul. 5-7, 2009, 8 pages.

Office action received for corresponding Korean Patent Application No. 2012-7033804, dated Oct. 14, 2014, 3 pages of Office Action and No page of Office Action translation Available.

Office action received for corresponding Canadian Patent Application No. 2797430, dated Aug. 18, 2014, 4 pages.

Office action received for corresponding Chinese Patent Application No. 201080066916.7, dated Jan. 19, 2015, 13 pages of office action and 2 pages of office action translation.

Office action received for corresponding Canadian Patent Application No. 2797430, dated Nov. 25, 2015, 7 pages.

Canadian Office Action for related Canadian Patent Application No. 2797430 dated Dec. 9, 2016, 6 Pages.

Office Action for corresponding European Patent Application No. 10 851 961.2-1222, dated May 28, 2018, 5 pages.

Office Action for the related Canadian Patent Application No. 2797430, dated Oct. 30, 2018, 7 pages.

* cited by examiner

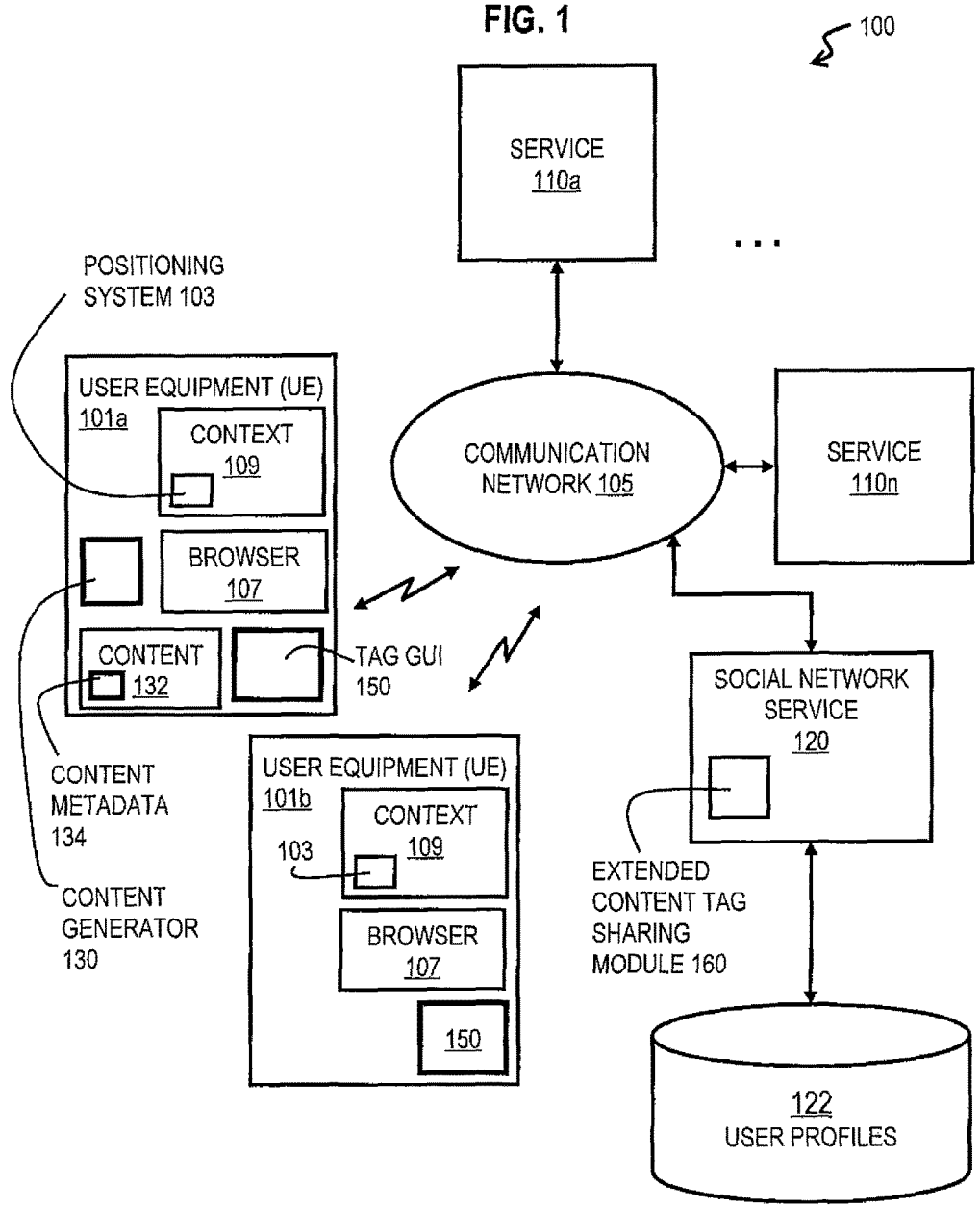

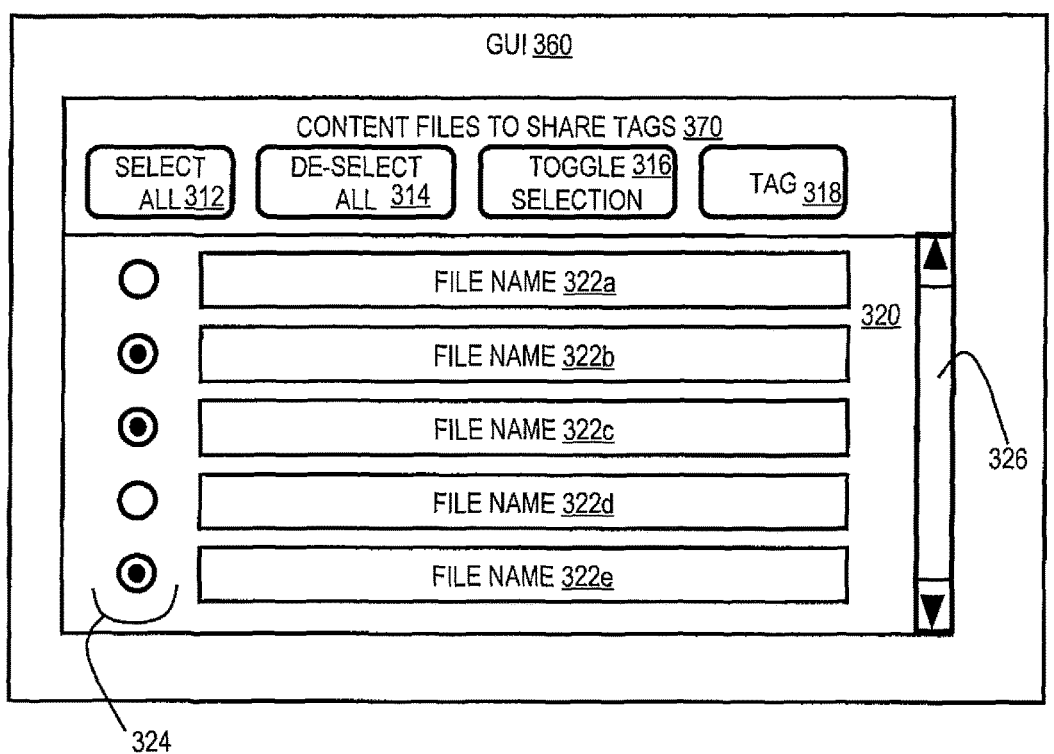

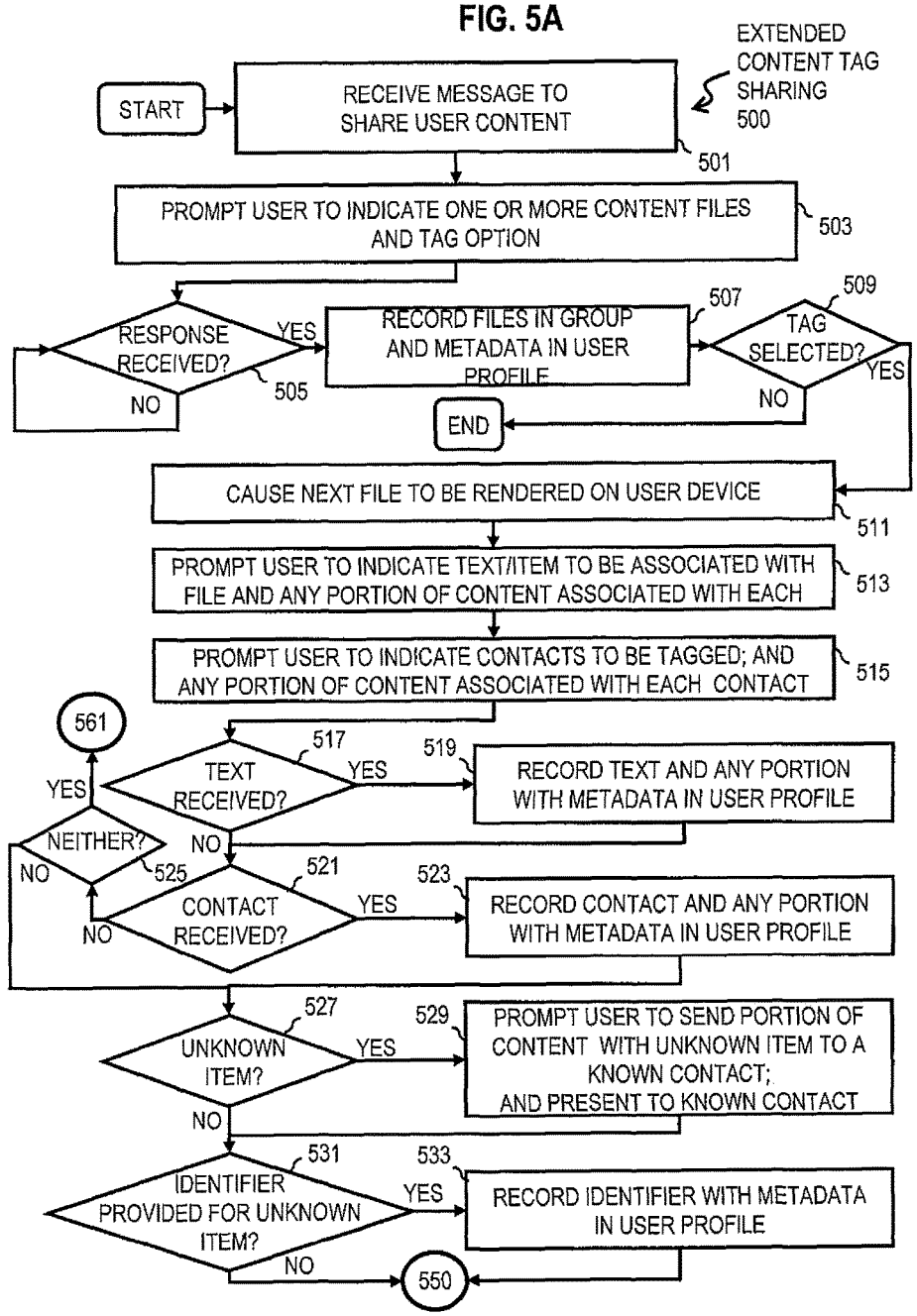

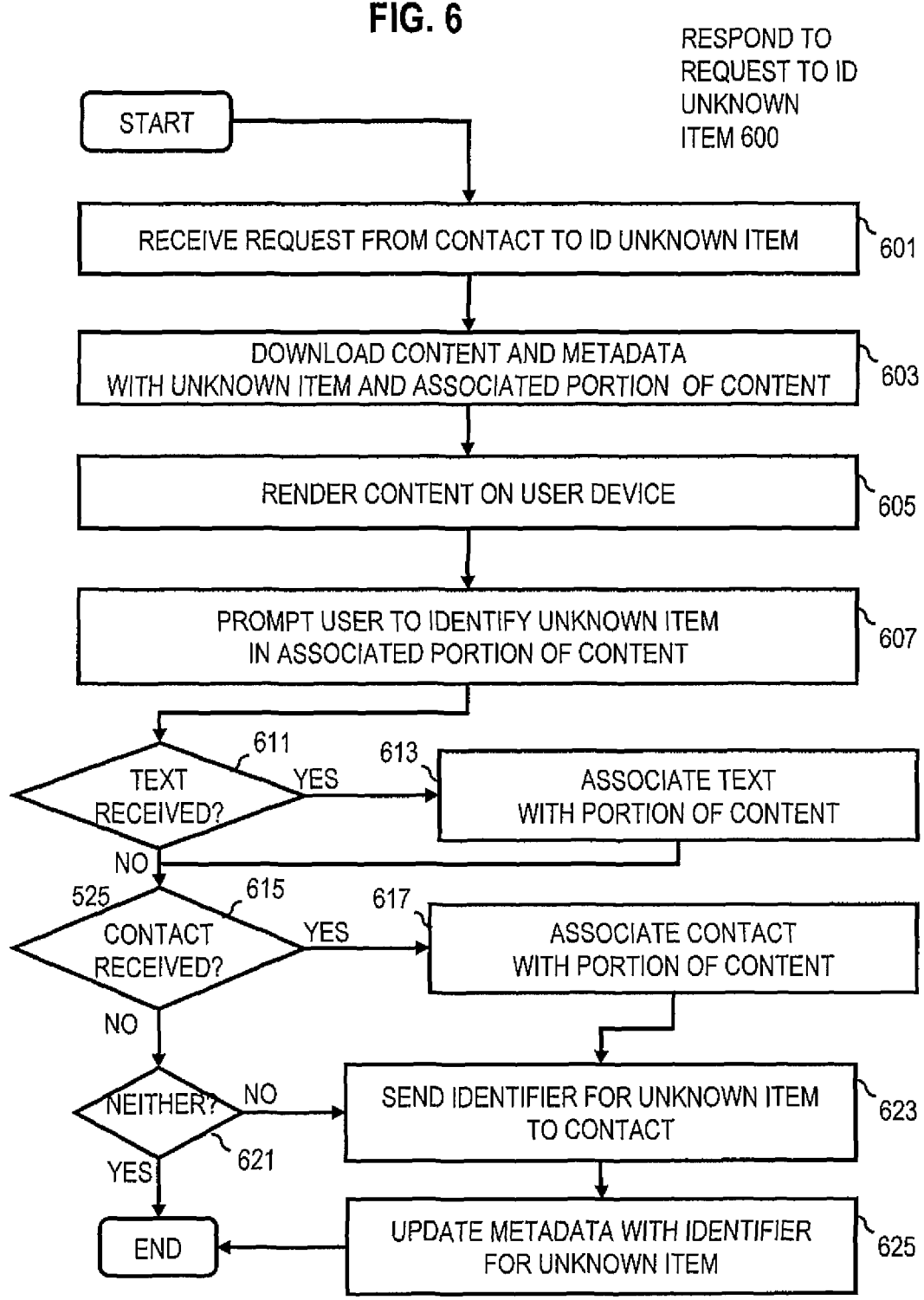

METHOD AND APPARATUS FOR EXPANDED CONTENT TAG SHARING

RELATED APPLICATION

This application was originally filed as PCT Application No. PCT/CN2010/073295 filed May 27, 2010.

BACKGROUND

Service providers and device manufacturers (e.g., wireless, cellular, etc.) are continually challenged to deliver value and convenience to consumers by, for example, providing compelling network services. For example, social network services allow users to share comments, World Wide Web links, and images (such as from photographs) among subscribers who have identified each other as friends. Photographs uploaded by one subscriber (owner) can be tagged by the owner with subject matter text and names of friends that appear in the photographs. The friends are then notified that they have been tagged in a photograph and can view the photograph on the home page of the owner. Comments by the visitor can be added in a comments section and shared with others who also comment.

SOME EXAMPLE EMBODIMENTS

While suitable for many purposes, it is noted that tagging photographs with the names of multiple persons, especially when there are multiple photographs in an album of related photographs, becomes tedious for the owner. As a consequence, one or more photographs are not tagged with all the persons depicted in the photograph. This diminishes the ability of the service to notify subscribers of the photographs that depict them. Therefore, there is a need for an approach for expanded content tag sharing that does not suffer one or more deficiencies of the prior art.

According to one embodiment, a method comprises determining data that associates, on an apparatus, a first user with a content identifier, wherein the content identifier indicates content provided by a different second user. The method also comprises causing, at least in part, actions that result in recording authorization data on the apparatus, wherein the authorization data indicates the first user is authorized to associate a different third user with the content identifier, without further input by the second user.

According to another embodiment, a method comprises determining a message received from an apparatus of a first user. The message comprises portion data that indicates a portion of content associated with the first user, and data that indicates a second user. The method also comprises causing, at least in part, actions that result in rendering the portion of the content on an apparatus of the second user, and prompting the second user for associating, with the portion data, an item identifier, wherein the item identifier indicates an identifier for the portion of the content.

According to another embodiment, a method comprises facilitating access to at least one interface configured to allow access to at least one service. The at least one service is configured to determine data that associates, on an apparatus, a first user with a content identifier, wherein the content identifier indicates content provided by a different second user. The at least one service is further configured to cause, at least in part, actions that result in recording authorization data on the apparatus, wherein the authorization data indicates the first user is authorized to associate a different third user with the content identifier, without further input by the second user.

According to another embodiment, a method comprises facilitating access to at least one interface configured to allow access to at least one service. The at least one service is configured to determining a message is received from an apparatus of a first user. The message comprises portion data that indicates a portion of content associated with the first user, and data that indicates a second user. The at least one service is further configured to cause, at least in part, actions that result in rendering the portion of the content on an apparatus of the second user. The at least one service is further configured to cause, at least in part, actions that result in prompting the second user for associating, with the portion data, an item identifier, wherein the item identifier indicates an identifier for the portion of the content.

According to another embodiment, an apparatus comprising at least one processor, and at least one memory including computer program code, the at least one memory and the computer program code configured to, with the at least one processor, cause, at least in part, the apparatus to determine data that associates, on an apparatus, a first user with a content identifier, wherein the content identifier indicates content provided by a different second user. The apparatus is also caused to cause, at least in part, actions that result in recording authorization data on the apparatus, wherein the authorization data indicates the first user is authorized to associate a different third user with the content identifier, without further input by the second user.

According to another embodiment, an apparatus comprising at least one processor, and at least one memory including computer program code, the at least one memory and the computer program code configured to, with the at least one processor, cause, at least in part, the apparatus to determine a message is received from an apparatus of a first user. The message comprises portion data that indicates a portion of content associated with the first user, and data that indicates a second user. The apparatus is also caused to cause, at least in part, actions that result in rendering the portion of the content on an apparatus of the second user. The apparatus is also caused to cause, at least in part, actions that result in prompting the second user for associating, with the portion data, an item identifier, wherein the item identifier indicates an identifier for the portion of the content.

According to another embodiment, a computer-readable storage medium carrying one or more sequences of one or more instructions which, when executed by one or more processors, cause, at least in part, an apparatus to determine data that associates a first user with a content identifier, wherein the content identifier indicates content provided by a different second user. The apparatus is also caused to cause, at least in part, actions that result in recording authorization data, wherein the authorization data indicates the first user is authorized to associate a different third user with the content identifier, without further input by the second user.

According to another embodiment, a computer-readable storage medium carrying one or more sequences of one or more instructions which, when executed by one or more processors, cause, at least in part, an apparatus to determine a message received from an apparatus of a first user. The message comprises portion data that indicates a portion of content associated with the first user, and data that indicates a second user. The apparatus is also caused to cause, at least in part, actions that result in rendering the portion of the content on an apparatus of the second user. The apparatus is also caused to cause, at least in part, actions that result in prompting the second user for associating, with the portion data, an item identifier, wherein the item identifier indicates an identifier for the portion of the content.

According to another embodiment, an apparatus comprises means for determining data that associates, on an apparatus, a first user with a content identifier, wherein the content identifier indicates content provided by a different second user. The apparatus also comprises means for recording authorization data on the apparatus, wherein the authorization data indicates the first user is authorized to associate a different third user with the content identifier, without further input by the second user.

According to another embodiment, an apparatus comprises means for determining a message received from an apparatus of a first user, wherein the message comprises portion data that indicates a portion of content associated with the first user, and data that indicates a second user. The apparatus also comprises means for rendering the portion of the content on an apparatus of the second user. The apparatus also comprises means for prompting the second user for associating, with the portion data, an item identifier, wherein the item identifier indicates an identifier for the portion of the content.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of expanded content tag sharing according to one embodiment;

FIG. 3D is a diagram of a user interface for tagging multiple contents, according to an embodiment;

FIG. 5A and FIG. 5B comprise a flowchart of a process for expanded content tag sharing, according to one embodiment;

FIG. 6 is a flowchart of a process for sharing the tagging of an unknown item, according to one embodiment;

DESCRIPTION OF SOME EMBODIMENTS

Figure 2A:
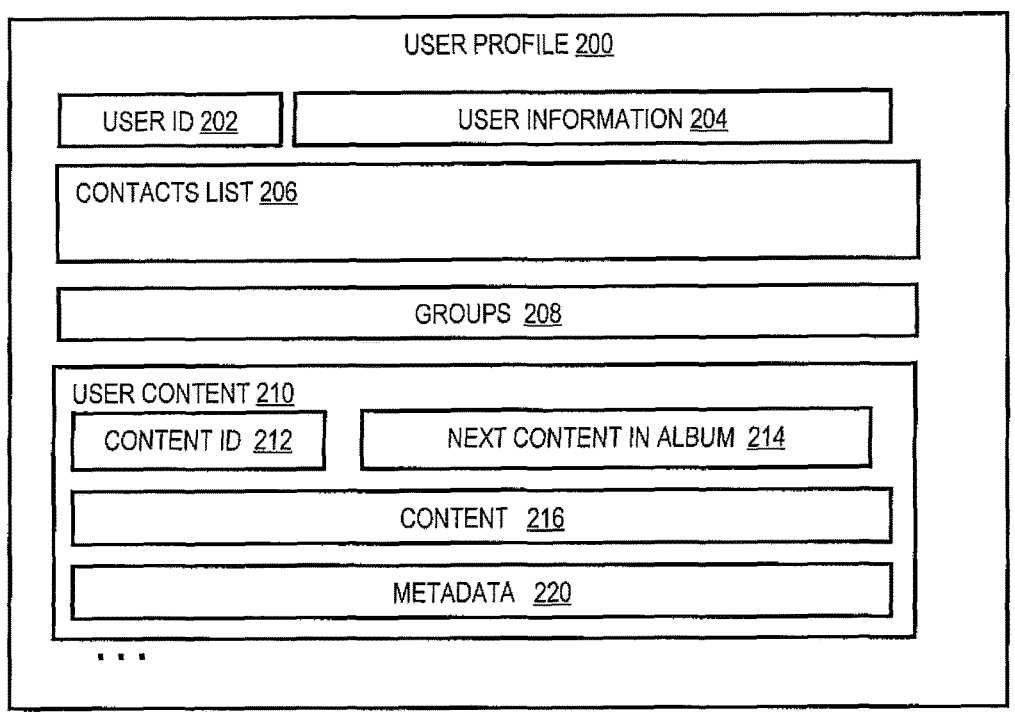
FIG. 2A is a diagram of a data structure for a user profile, according to an embodiment.

Examples of a method, apparatus, and computer program for expanded content tag sharing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term content refers to digital data for presentation to a human user and includes, for example, digital sound, songs, digital images, digital games, digital maps, point of interest information, digital videos, such as music videos, news clips and theatrical videos, advertisements, electronic books, presentations, program files or objects, any other digital media or content, or any combination thereof. The terms presenting and rendering each indicate any method for presenting the content to a human user, including playing audio or music through speakers, displaying images on a screen or in a projection or on tangible media such as photographic or plain paper, showing videos on a suitable display device with sound, graphing game or map data, or any other term of art for presentation, or any combination thereof.

As used herein, the term tag refers to one or more data fields in a metadata data structure associated with content on a network device. Each tag data field is for holding data that identifies an item included in at least a portion of the content. An item is a person or thing or activity or other concept that is evident to at least one human user when the content is rendered for presentation to that human. Tagging refers to inserting data to occupy one or more tag data fields in the metadata data structure, or adding a tag data field to the metadata data structure, or some combination.

Although various embodiments are described with respect to photographs uploaded to a social networking service, it is contemplated that the approach described herein may be used with other types of content, shared directly among peers, or indirectly through a network service, such as a music store, a social networking service, and a file sharing service, among others.

FIG. 1 is a diagram of a system 100 capable of expanded content tag sharing according to one embodiment. When content, such as a photograph, is added by a user at user equipment (e.g., UE 101a), it is associated with metadata that describes the content, such as name, size and format of one or more files that hold the content, the device that captured or generated the content, the time and place where the content was generated. The content may be shared with other users by sending the content to one or more contacts of the user, or by uploading to a sharing service, such as a social networking service. However, the subject of the content or one or more persons whose voices or other likenesses are included in the content are typically added to the content by the human user who generated the content.

This can be tedious, especially for a group of contents, e.g., multiple photographs taken at an event, such as a party or trip. As a consequence, one or more contents are not tagged with all identifiers for items included in the content, such as subject matter, persons, things, activities. This diminishes the ability of a service to notify users about the contents that are relevant to those users.

To address this problem, the system 100 of FIG. 1 introduces the capability to share the tagging of content beyond what is currently available. In some embodiments, the system 100 authorizes any user tagged in metadata for one or more contents in a group to further tag those contents. As a result, the number of authorized users who can tag the contents grows, sharing the load of tagging the contents. An advantage of authorizing tagged persons to further tag the content is to distribute the load of tagging content, thus increasing the probability that contents are more completely tagged, and increase the ability of a service to notify users about the contents that are relevant to those users. In some embodiments, the system 100 allows a user, who is authorized to tag the content, to indicate a portion of the content that includes an unknown item, such as an unknown person or object. At least that portion of the content is sent to one or more contacts, such as others already tagged in the content, to identify the item. An advantage of forwarding portions of content with an unknown item to a contact is to increase the probability that contents are more completely tagged, and, thus, to increase the ability of a service to notify users about the contents that are relevant to those users.

For example, in some embodiments, the system 100 determines that a first user is associated with content provided by a different second user (e.g., the owner of the content) by tags indicting the first user. The system 100 then indicates the first user is authorized to associate a different third user with the content provided by the second user, without further input by the second user. This can be done either on the user equipment or by a remote network service, such as a social network service. In some embodiments, the system 100 determines a message is received from an apparatus of a first user. The message indicates a portion of content associated with the first user and data that indicates a second user, who is requested to identify an item in the portion of the content. In these embodiments, the system 100 renders the portion of the content on an apparatus of the second user, and prompts the second user for associating an identifier for the portion of the content with the portion of the content. This can be done either on the two user equipment or by a remote network service, such as a social network service.

As shown in FIG. 1, the system 100 comprises user equipment (UE) 101*a* and UE 101*b*, collectively referenced hereinafter as UE 101, having connectivity to one or more network services 110*a* through 110*n* and social network service 120, collectively referenced hereinafter as network services 110, via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GARS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 are any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.). An example mobile terminal is described in more detail below with reference to FIG. 9.

In the illustrated embodiment, one or more processes execute on each UE 101, with at least UE 101*a* including a content generator 130, such as a camera, video recorder, audio recorder, game module, drawing module, image downloading and editing module, or other module. Many such processes and modules are well known in the art. The content generator 130 generates content 132 with at least some content metadata 134. UE 101*b* belongs to a different user with whom the content 132 generated at UE 101*a* is to be shared. In the illustrated embodiment, each UE 101 also includes a context module 109 that determines at least some context information that is included in the metadata 134 for the content generated locally, such as time, location, and application programs currently running on the UE 101. For example, each context module 109 includes a positioning system module 103 for determining the current position of a mobile device. Each UE 101 also includes a graphical user interface (GUI) module 150 for tagging content generated locally or shared, as described in more detail below. This module 150 is called hereinafter a tag GUI module 150.

By way of example, the UE 101, and network services 110, including social network service 120, communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. Often, the data in the payload for the particular protocol includes a header and payload for a different protocol associated with a different, higher layer of the OSI Reference Model. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages. (Web pages are typically formatted according to the hypertext markup language, HTML). In the illustrated embodiment, each UE 101 includes a browser 107 to serve as a client process for one or more services 110. In some embodiments, the tag GUI module 150 is generated in a Web page by the network service 110, such as social network service 120, and is included within the browser 107. In some embodiments, the tag GUI module 150 is a client process of another server, such as a client process of extended content tag sharing module 160. In some embodiments, the tag GUI module is not a client process but a standalone process that interacts with similar processes, called peers, on other UE 101. For example, in some embodiments, the tag GUI module 150 on UE 101*a* communicates with a peer tag GUI module 150 on UE 101*b*. Similarly, in some embodiments, the context module 109 is a client of a context server among network services 110. In some embodiments, the content generator 130 is a client of a content generation server among network services 110.

The network services 110 are remotely located in some embodiments. Each network service 110 facilitates access to at least one interface configured to allow access to at least one service. In some embodiments, one or more of services 110 grant access rights to allow a user to access the same or different service. Many of the network services 110 are servers that interact with one or more clients on UE 101, such as browser 107 or a tag GUI module 150 performing as a client. The social network service 120 is a server that maintains a user profiles data structure 122 with data for each subscriber and contacts for that subscriber, and interacts with a standard browser as a client on UE 101. The user profiles data structure 122 is described in more detail below with reference to FIG. 2A.

Although services, processes, modules and data structures are depicted in FIG. 1 as integral units arranged in a particular way for purposes of illustration, in other embodiments, one or more services, processes, modules, or data structures, or portions thereof, are arranged in a different manner on the same or different one or more nodes of network 105. It is contemplated that the functions of these components may be combined in one or more components or performed by other components of equivalent functionality.

FIG. 2A is a diagram of a data structure 200 for a user profile, according to an embodiment. The user profiles data structure 122 includes a user profile, such as user profile data structure 200, for each user who subscribes to the social network service. The user profile data structure 200 includes a user identifier (ID) field, a user information field 204, a contacts list field 206, groups field 208, and one or more user content fields 210, as indicated by ellipsis.

The user ID field 202 holds data that indicates a unique subscriber to the social network service. For example, the user ID field holds data that indicates a social network name (e.g., "FastFreddy"), or an actual first or last name and number, or a electronic mail (email) address, or a Mobile Subscriber Integrated Services Digital Network Number (MSISDN, which is a cell telephone number) or some other identifier defined by a network service, such as an International Mobile Subscriber Identity (IMSI) identifier, a unique 15-digit code used to identify an individual user on a global system for mobile communications (GSM) network. An IMSI value is typically stored on a Subscriber Identity Module (SIM card), a device used to store information in many mobile phones, especially for advanced features.

The user information field 204 holds other data for the subscriber, such as full name, postal address, account number, email address, birth date, education, employment, relationship status, among many others that a subscriber may choose to share or withhold from other subscribers to the service, alone or in any combination.

The contacts list field 206 holds data that indicates any other subscribers with whom the user identified in field 202 shares information, such as the user IDs of those other users, each user ID serving as a key to a particular user profiles from which other information can be determined. In some embodiments, the contacts list groups the contacts into various categories, such as friends, colleagues, clients and acquaintances, with which different levels of information are shared.

The groups field 208 holds data that indicates any groups to which the user identified in field 202 has joined. For example, social groups are formed for different professions, different geographic areas, different political or religious views, fans of different celebrities or sports teams, among others. A subscriber is permitted to join one or more of these groups. The groups joined are listed in groups field 208.

The user content field 210 holds data that indicates some content uploaded to the social network service for sharing among one or more categories of the contacts listed in field 206. The user content field 210 includes a content identifier (ID) field 212, a pointer 214 to the next content in an album of related contents, a content field 216 and a metadata field 220. The content is thus available to the network service, such as the social network service 120, for sharing with one or more subscribers in the contacts list field 206. In some embodiments, a version of the user contents field 210 is stored in the content data structure 132 on the UE 101 (e.g., on UE 101a), from which the content can be sent to a network service 110 or to the tag GUI module 150 on another UE 101 (e.g., on UE 101b).

The content ID field 212 holds data that uniquely identifies the content among the content associated with the user identified in field 202, such as a timestamp and content type (audio, image, video, game, etc.). The pointer 214 holds data that indicates the next content in an album of related content e.g., contents generated or uploaded at closely related times, by the same user or by multiple users who appear in the user's contacts list and are located close geographically. The other contents are identified in field 214 by their corresponding content ID values. The content field 216 holds data that indicates the content, e.g., a pointer to a field, memory location or one or more file with the content, or the actual coded values that are used to render the content for presentation to a human. The metadata field holds data that indicates information about the content, e.g., to determine how to present the content or the relevance of the content to one or more other subscribers or contacts of the user identified in field 202, or some combination. In some embodiments, metadata field 220 holds data that points to a separate one or more files where the metadata are actually stored.

Figure 2B:
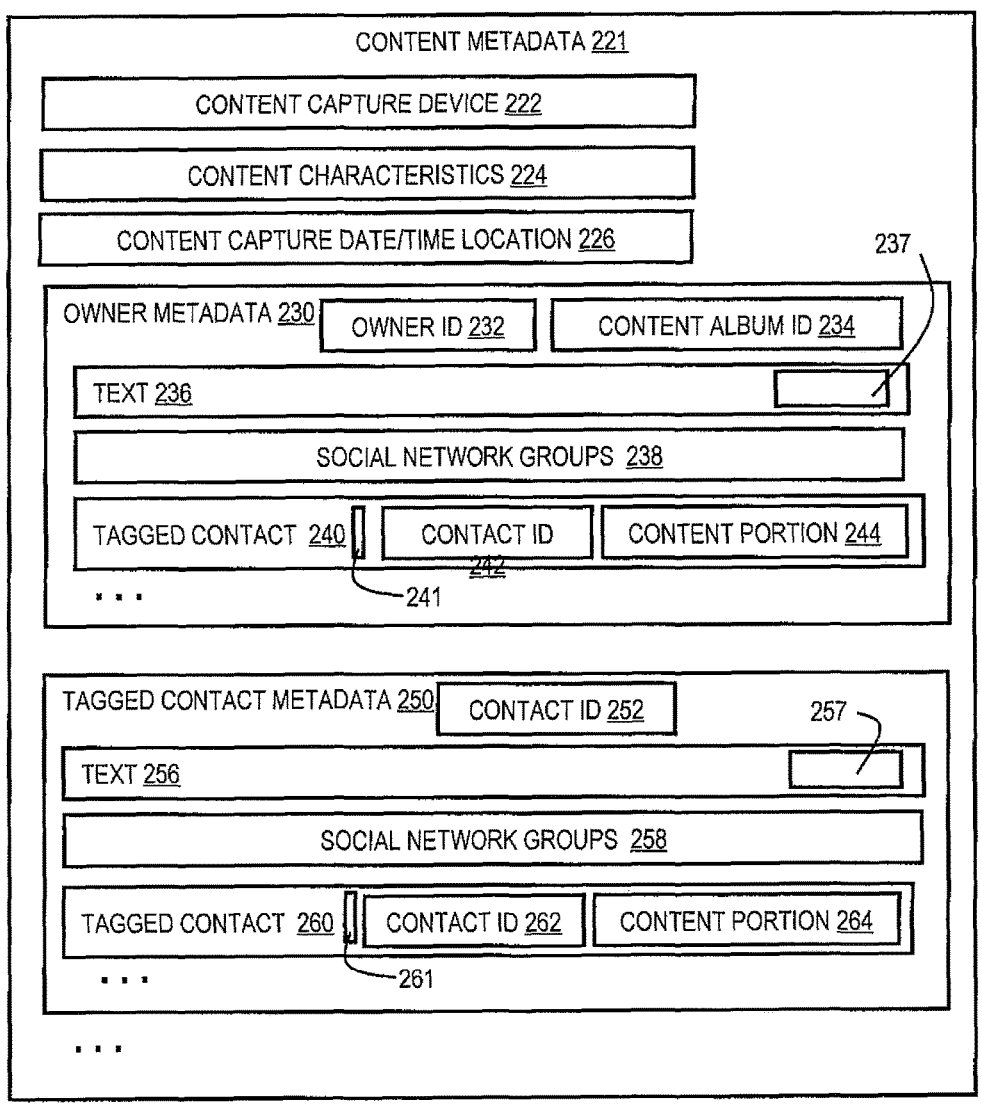
FIG. 2B is a diagram of a data structure for content metadata, according to an embodiment.

FIG. 2B is a diagram of a data structure 221 for content metadata, according to an embodiment. The content metadata data structure 221 is a particular embodiment of field 220 in the user content field 210. The content metadata data structure 221 includes a content capture device field 222, content characteristics field 224, a content capture date/time locations field 226, an owner metadata field 230 and one or more tagged contact metadata fields 250 indicated by ellipsis. The tagged contact metadata fields 250 are means to achieve the advantage of expanding the metadata and tagging of content, so that a system can more accurately notify subscribers of relevant content.

The content capture device field 222 holds data that indicates a device, if any, used to capture the content, such as a digital camera manufacturer name and model number and software used to interface with the UE 101. Any manner may be used indicate such information, such as one or more fields of the exchangeable image file format (EXIF) or other digital media formats. If the content was generated entirely in software, field 222 indicates the software used to generate the content. The content characteristics field 224 holds data that indicates how the particular content was generated from the device indicated in field 222. For example, the orientation of an image, the spatial and temporal spacing of picture elements (pixels), images or audio pressure series, the format for coding the content, the type of data compression, the focal length of any lens, the lighting source, the exposure time, etc., as appropriate for the type of content.

The content capture date/time location field 226 holds data that indicates the date and time of capturing or generating the image or starting or ending the audio or video stream, and the location where the content was generated, if available. The data in this field provides a time and place context for the content.

The owner metadata field 230 holds metadata provided by the user who generated the content, e.g., the user of UE 101a who took a picture or recorded sounds with the camera or microphone on the cell phone of the user. In the illustrated embodiment, the owner metadata field 230 includes an owner identifier (ID) field 232, a content album identifier (ID) field 234, one or more text fields 236, a social network groups field 238 and one or more tagged contact fields 240 indicted by ellipsis.

The owner ID field 232 holds data that indicates the user who generated the content described by this metadata, e.g., using an identifier in field 202. This field is especially useful when the metadata resides in a user content field 210 outside a user profile data structure 200, e.g., in content data structure 132 or when delivered to a different device, e.g. UE 101b. The field 232 is a means to achieve the advantage of determining an owner when the content is sent outside a user profile.

The content album ID field 234 holds data that uniquely identifies an album of multiple contents that are related and might be tagged with similar information, e.g., contents generated or uploaded at closely related times, by the same user or by multiple users who appear in the user's contacts list and are located close geographically. Any album ID may be used; in various embodiments, an album ID is a sequence number generated by the user equipment, or the network service, or a name provided by the user. In some embodiments, the pointer in field 214, described above is used instead of the album ID field to associate related contents, and album ID field 234 is omitted. The album ID field is an example means to achieve the advantage of associating related contents.

The text field 236 holds data input by the owner (e.g., by voice or typed text) to describe the subject matter of the content or persons who are not contacts within the network service, such as the social network service. In some embodiments, the text field 236 includes a content portion field 237 to indicate that the text applies to a portion of the content rather than to the entire content. In some of these embodiments, multiple text fields 236 are included in the owner metadata field 230, one text field for each different portion of the content being tagged.

The social network groups field 238 holds data that indicates any social network groups the members of which would be interested in the content. Any method may be used to determine the groups indicated by the data in field 238. For example, in some embodiments, the owner selects the groups from a pull down menu of groups to which the owner belongs. In some embodiments, the group is inferred from the context information, e.g., by another member of the group being in the vicinity of the owner at the time the content was generated.

The tagged contact field 240 holds data that indicates a contact from the owner's contact list in field 206 who has been identified by the owner as represented in the content, by voice or image or other likeness. For example, the user ID of the contact is indicated in the contact ID field 242 in the tagged contact field 240. In some embodiments each tagged contact is automatically authorized to further tag the content. All authorized contacts must trace their authority back to the owner. The tagged contact fields 240 are an example means to achieve the advantage of determining that the owner has granted authority to the contacts listed.

In some embodiments, not all tagged contents are authorized to further tag the content. In these embodiments the tagged contact field 240 includes an authorized contact flag field 241 which holds data indicating one value for an authorized tagged contact, and a different value for a contact who is not authorized to further tag the content.

In some embodiments, the tagged contact is identified not only with the content but with a particular portion of the content. In such embodiments, the tagged contact field 242 includes both the contact ID field 242 and a content portion field 244. The content portion field 244 holds data that indicates a portion of the content. Any method may be used to indicate the portion, such as a start and stop time of an audio or video recording, or a center pixel and size of an area of an image (default size or specified size), or coordinates of an upper left pixel and lower right pixels that define a rectangle that encompasses the portion. Further contacts tagged by the owner are indicated in subsequent tagged contact fields 240 indicated by ellipsis.

According to some embodiments, one or more (or all) contacts identified in a contact ID field 242 are authorized to further tag the content with text or social network groups or additional contacts. Some or all of those additional contacts also become authorized to further tag the content. Thus the population of authorized contacts can grow sufficiently to distribute the load of tagging contact.

The metadata produced by such authorized contacts are presented in tagged contact metadata field 250 and others indicated by ellipsis. The tagged contact metadata field 250 includes a contact ID field 252, a text field 256, a social network groups field 258 and one or more tagged contact fields 260. The contact ID field 252 holds data that indicates a contact different from the owner. In some embodiments, the contact ID field 252 holds data that indicates a contact who is also different from any preceding tagged contact metadata field 250 contact ID field 252.

The text field 256 holds data input by the authorized contact identified in field 252 (e.g., by voice or typed text) to describe the subject matter of the content or persons who are not contacts within the network service, such as the social network service. In some embodiments, the text field 256 includes a content portion field 257 to indicate that the text applies to a portion of the content rather than to the entire content. In some of these embodiments, multiple text fields 256 are included in the tagged contact metadata field 250, one text field for each different portion of the content being tagged.

The social network groups field 258 holds data that indicates any social network groups to which the authorized contact belongs, the members of which might be interested in the content. Any method may be used to determine the groups indicated by the data in field 258. For example, in some embodiments, the authorized contact selects the groups from a pull down menu of groups to which the authorized contact belongs. In some embodiments, the group is inferred from the context information, e.g., by another member of the group being in the vicinity of the authorized contact at the time the content was generated.

The tagged contact field 260 holds data that indicates a contact from the authorized contact's contact list (in the authorized contact's user profile data structure, not shown) who has been identified by the authorized contact as represented in the content, by voice or image or other likeness. For example the user ID of the new contact is indicated in the contact ID field 262 in the tagged contact field 260. In some embodiments in which not all tagged contacts are authorized to further tag the content, an authorized contact flag field 261 is included, as described above for field 241. In some embodiments, the tagged contact is identified not only with the content but with a particular portion of the content. In such embodiments, the tagged contact field 262 includes both the contact ID field 262 and a content portion field 264. The content portion field 264 holds data that indicates a portion of the content. Further contacts tagged by the authorized contact, if any, are indicated in subsequent tagged contact fields 240 represented by ellipsis.

According to some embodiments, any contact identified in a contact ID field 262 is also authorized to further tag the content with text or social network groups or additional contacts. The metadata produced by such authorized contacts are presented in tagged contact metadata fields 250 indicated by ellipsis. In some embodiments, only some tagged contacts are authorized to add further tags. Those contacts are distinguished by a value in the authorized contact flag fields 241, 261. In embodiments where all tagged contacts are authorized to further tag the content, one or both of the authorized contact flag fields 241 and 261 are omitted.

Although data structures and fields are shown in FIG. 2A and FIG. 2B as integral blocks in a particular order for purposes of illustration, in other embodiments, one or more data structures or fields, or portions thereof, are arranged in a different order or omitted, or held in one or more databases, or spread over one or more nodes connected to a communications network, such as network 105, or changed in some combination of ways.

As described in more detail below, these structures increase the visibility of a particular image, or other content, by introducing a propagation measure based on the available tags. The tags come from the tagging operations of different users, and every time a new person is tagged out in an image, the image is shared to him/her as well, and then this person is eligible for further tagging on the image. By this means an image or the whole album is incrementally tagged and shared. An advantage of such embodiments is that the more an image, or other content, is tagged, the more access is granted, and the more correlated people are able to see and further tag the image or other content. As a consequence, more and more information is accumulated about the image or other content, and the more likely the content is delivered to the interested users.

Furthermore, by associating contents in an album, the tagging of other contents in the album is accomplished simultaneously, in some embodiments. For example, often a set of images are taken at approximately the same time, and people would like to share them all together in an album. So, in some embodiments, when some people have been tagged for particular content, the same people are tagged in the remaining images in the album. In some embodiments, if one person has been tagged in one of the contents in an album, that person is also tagged in all the other contents in the album. Thus the tagging of this person is shared among the pictures in the album, even though that person has not been manually marked in every picture in the album.

Figure 3A:
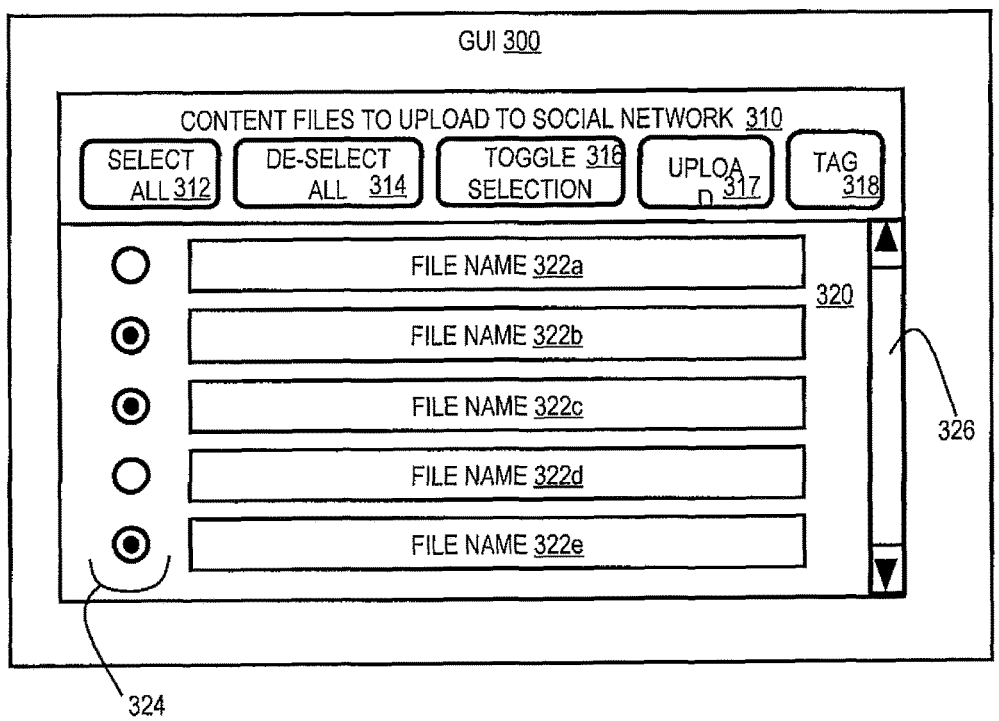
FIG. 3A is a diagram of a user interface for grouping content provided by a user, according to an embodiment.

FIG. 3A is a diagram of a user interface 300 for grouping content provided by a user, according to an embodiment. In the illustrated embodiments, the user interfaces are graphical user interfaces (GUIs), depicting graphical components with which a human can interact, as is well known in the art. However, in other embodiments, other user interfaces may be used, such as an audio interface with audio prompts and spoken responses converted to text. In GUI 300, and others depicted in the following figures, a user indicates a portion of the screen displaying the graphical components and elements, either with a cursor moved by a separate pointing device, or by touching a touch screen as the pointing device. For convenience, the use of a cursor in response to a pointing device is described, but it is understood in some embodiments that a cursor is omitted and a user touches directly a part of the screen to interact with a particular graphical element or other component.

The GUI 300 is displayed on UE 101 by tag GUI module 150. In some embodiments tag GUI module 150 operates within browser 107 in response to HTTP messages from extended content tag sharing module 160 on social network service 120 and each GUI is a different HTML page received in the HTTP messages. The GUI 300 includes a display area 310 where a user can determine content files on the UE 101 to share, e.g., by uploading to social network service 120. The display area 310 includes prompt text inviting the owner to indicate which content files are to be shared, such as the illustrated text "Content files to upload to social network" for embodiments that do the sharing of content through a social network 120.

The display area 310 includes file list area 320 in which content files on the UE 101 are listed, e.g., by file name as depicted. File names are listed in file name areas 322a through 322e. To view any additional file names, a scroll bar 326 is included which can be operated, as is well known, to cause the list to scroll up or down and bring other file name areas into view. Associated with each file name area is a radio button 324 that can be selected with a pointing device operated by a user, as is well known in the art. Any file name can be selected, as indicated by a radio button filled with a solid circle, or become or remain unselected, as indicated by a hollow radio button. For purposes of illustration file list area 320 shows file name 322b, file name 322c and file name 322e have been selected to be shared.

The display area 310 includes buttons 312, 314, 316, 317 and 318 which can be selected by a pointing device operated by a user, as is well known in the art. When activated, select all button 312 causes all the file names to be selected; and de-select all button 314 causes all file names to be unselected. When activated, toggle selection button 316 causes all the currently selected file names to become unselected and all currently unselected file names to be selected. When activated, the upload button causes the selected files to be stored for sharing, such as being uploaded to the user profile of the social network service 120. When activated, the tag button 318 causes the tag GUI 150 to display the next GUI screen, where a user can enter information to tag one or more of the selected content files, so that data is added to the metadata for one or more of the selected files.

Figure 3B:
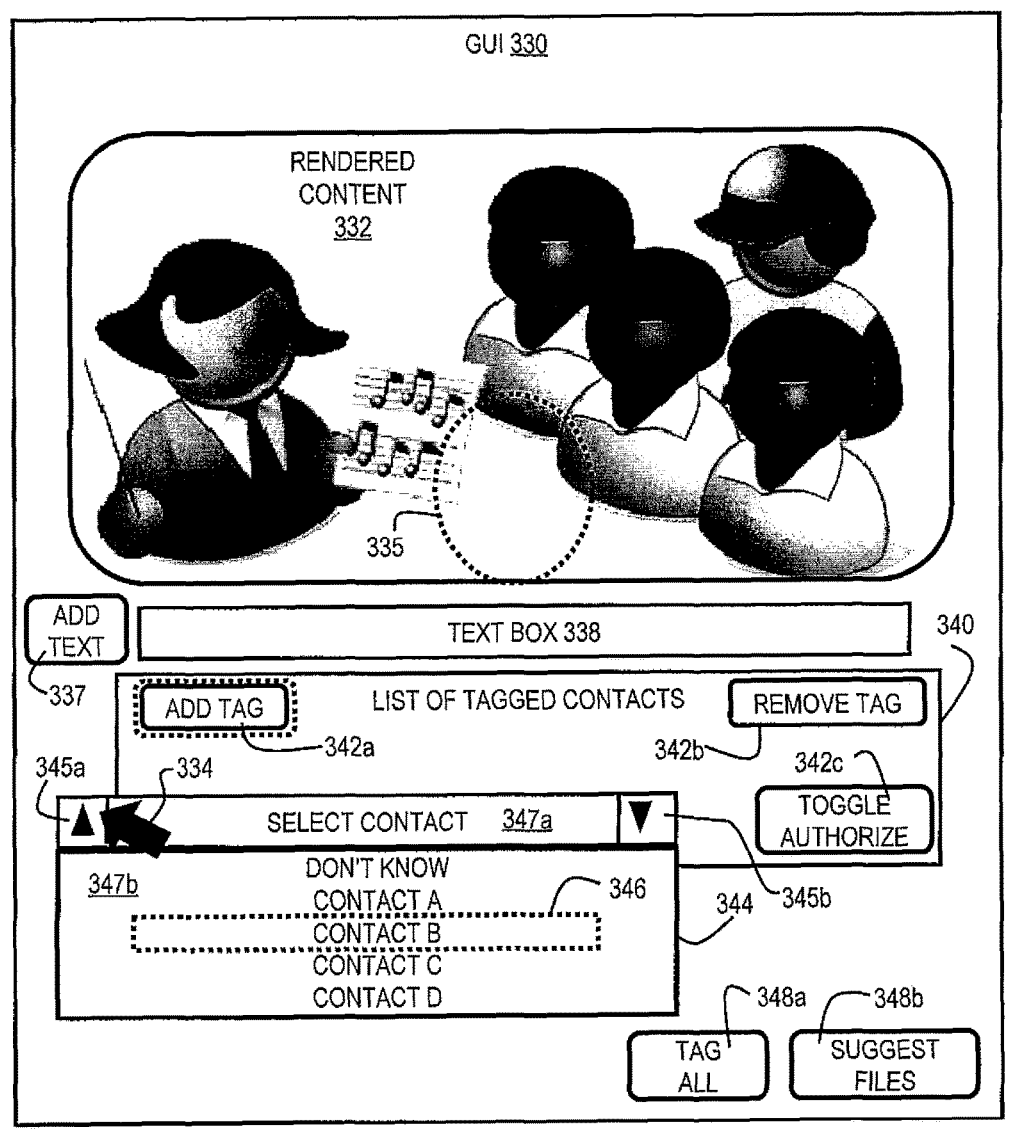
FIG. 3B is a diagram of a user interface for prompting the tagging of at least a portion of content with one or more contacts of a user, according to an embodiment.

FIG. 3B is a diagram of a user interface 330 for prompting the tagging of at least a portion of content with one or more contacts of a user, according to an embodiment. The GUI 330 is displayed on UE 101 by tag GUI module 150, as described above for GUI 300. The GUI 330 includes a rendered content area 332, a text tagging area including an add text button 337 and a text box 338, and a contact tagging area 340. The GUI 330 also includes a tag all button 348a and a suggest files button 348b.

The rendered content area 332 renders the content, such as an image, a video clip, an audio clip, a game, etc., as appropriate for the content. For example, video and audio are rendered with play, pause, reverse, fast forward and stop buttons (not shown) in area 332. For purposes of illustration, it is assumed that the content is a photograph of choir practice that includes a musical director, three singers in a front row and a helmeted person in a back row. This image is presented in rendered content area 332.

In some embodiments, a portion of the content is indicated, e.g., to associate a tag with a portion of the image rather than the entire image. In such embodiments, a portion is indicated around a pointing device, e.g., a portion within dashed oval 335 centered on curser 334. In an audio or video file, a portion may include a time period on a timeline (not shown) displayed with the play and pause buttons in the rendered content area 332. The size of the portion can be changed, e.g., by dragging the cursor while depressing a button on the pointing device, or by touching a touch screen with two fingers and moving the fingers apart to enlarge the portion or together to reduce the portion. In some embodiments, a default size is used. In some embodiments, the portion 335 is fixed in location where the pointing device is last activated within the rendered content area, e.g., where the cursor 334 is last positioned when a pointing device button is pressed, or where a user last touched the screen within the rendered content area 332.

The text box 338 is used to enter text, as is well known in the art, e.g., using keys on a keypad to indicate letters, spaces and punctuation marks. The add text button 337 is activated by a user to tag the content with the text in text box 338, e.g., to store the text in text field 236 of metadata data structure 221 if the user is the owner of the content, or in text field 256 of data structure 221 otherwise. In some embodiments, the text is associated with the portion 335 of the content instead of the entire content.

The contact tagging area 340 includes an add tag button 342a and a remove tag button 342b and a toggle authorize button 342c as well as a label indicating that the area presents a list of contacts tagged to the content presented in rendered content area 332. In the illustrated embodiment the label is the phrase "list of tagged contacts."

When the add tag button 342a is activated, as indicated by the dotted outline, a select contact display area 344 is presented. The select contact display area 344 includes a prompt bar 347a and a contact list area 347b. The prompt bar 347a presents text to prompt the user to select a contact, such as the expression "select contact" depicted in FIG. 3B. A list of the user's contacts from which to select, e.g., from the contact list field 206 of the user profile data structure 200 or a local source on the UE 101a, is presented in the contact list area 347b. One of the listed contacts is highlighted as indicated by the dotted rectangle 346. The highlighted area can be moved up or down on the list by using a pointing device, such as cursor 334, to activate up or down control areas 345a and 345b, respectively, as is well known in the art.

When the highlighted tag is the correct one, the choice is accepted, e.g., by activating the add tag button again. The highlighted contact is associated with the content, e.g., by being added to field 242 in the metadata data structure 221 if the user is the owner of the content, or by being added to field 262 in the metadata data structure 221 otherwise. If some embodiments, the portion 335 of the rendered content is also associated with the tag, e.g., by being added to field 244 in the metadata data structure 221 if the user is the owner of the content, or by being added to field 264 in the metadata data structure 221 otherwise.

The process can be repeated to tag the content with all the contacts that are encompassed by the content. The selected contacts are listed in display area 340. A contact tag can be removed in a manner similar to adding a tag. The remove tag button is activated; the contact to remove is highlighted; and the remove tag is activated again.

In some embodiments, not all tagged contacts are authorized to further tag the content. In such embodiments, the authorization of each contact is determined by user input. For example, as each contact is added to the list of tagged contacts, the contact is marked as authorized, e.g., with a checkmark in an authorized column (not shown) in display area 340. This default authorization is an example means to achieve the advantage of encouraging distributed shared tagging. However, the user has the option to change the mark to unauthorized, e.g., removing the check mark in the authorized column, by highlighting the particular contact and activating the toggle authorize button 342c. The user also easily changes back by pressing the toggle authorize button when an unauthorized contact is highlighted in the display area 340.

In some embodiments, content or a portion of the content can receive special handling by using a special tag. For example, the "don't know" tag can be used to label a portion of the content which the user seeks help in identifying, as described in more detail below with reference to FIG. 4A and FIG. 4B and FIG. 4C. Thus "don't know" is included in the options listed in the contacts list display area 344, and can be selected.

The tag all button 348a is activated by the user to tag all the contents in the album with the same tags as the current content. The suggest files button 348b is activated by the user to have the tag GUI suggest content files that should receive the same tags based on context. The text and contact tags in fields 236, 242, 256 and 262 of the metadata data structure 221 for the current content (presented in rendered content area 332) are copied to the corresponding fields of the metadata data structures 221 of the other contents selected. In some embodiments, the data in the content portion fields 244 and 264 are not copied, because it is unlikely that the same persons appear in the same positions in the other content files. The suggestion operation is described in more detail below with reference to FIG. 3D.

Figure 3C:
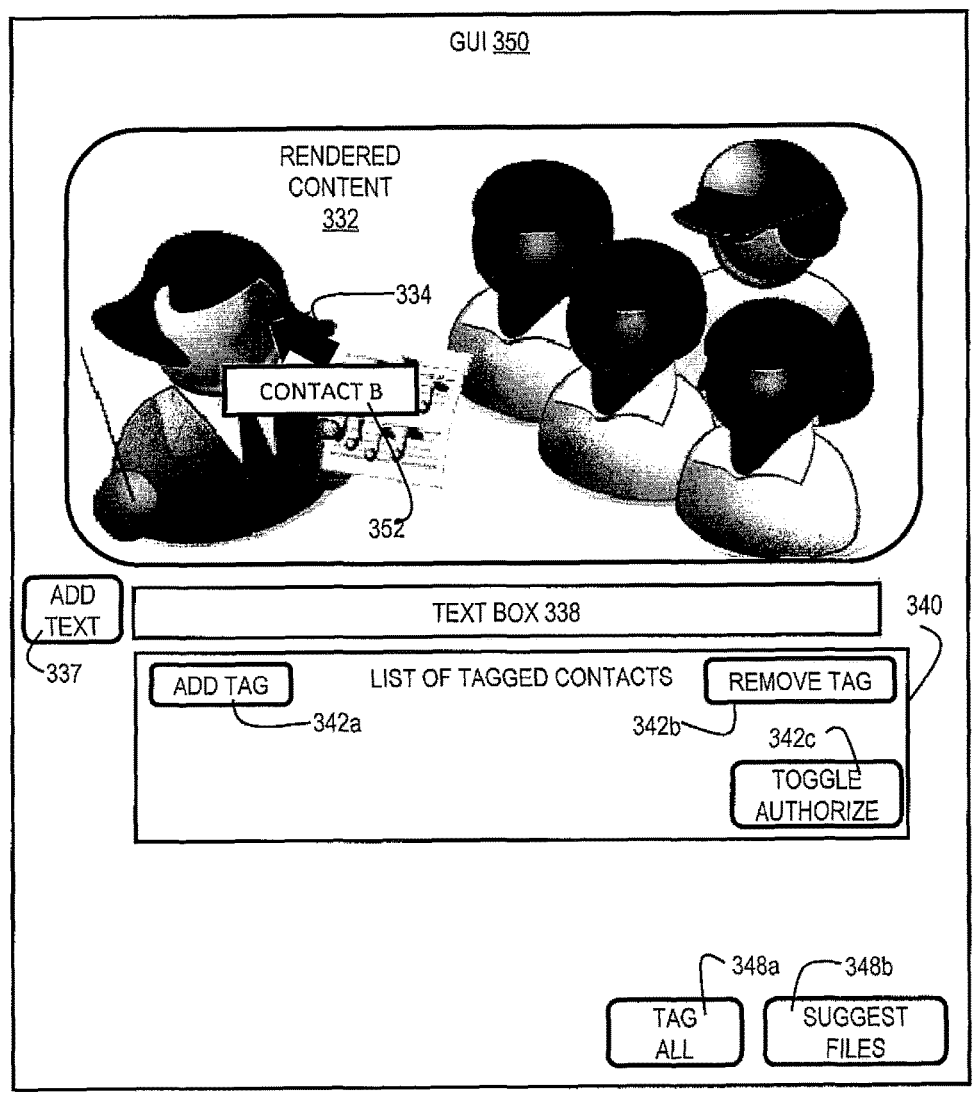
FIG. 3C is a diagram of a user interface for tagging at least a portion of content with one or more contacts of a user, according to another embodiment.

FIG. 3C is a diagram of a user interface 350 for tagging at least a portion of content with one or more contacts of a user, according to another embodiment. The GUI 350 is displayed on UE 101 by tag GUI module 150, as described above for GUI 300. The rendered content area 332, add text button 337, text box 338, contact tagging area 340 with add tag button 342a and remove tag button 342b, tag all button 348a and suggest files button 348b are as described above.

When the cursor 334 is place inside a portion of the content, the contact associated with that portion, if any, is displayed. For example, when the cursor 334 is placed over the music director as depicted in FIG. 3C, a text box appears with the name of the contact, e.g., contact B. If contacts are not associated with corresponding portions of the content, no text box appears as the cursor 334 is moved over the rendered content area 332. Thus a user can check the tagging before sharing the content. The appearance of text box 352 is an example means to achieve the advantage of checking the tagging of portions of the content.

FIG. 3D is a diagram of a user interface 360 for tagging multiple contents, according to an embodiment. The GUI 360 is displayed on UE 101 by tag GUI module 150, as described above for GUI 300. The GUI 360 includes a display area 370 where a user can determine content files on the UE 101 to share tags. The display area 370 includes prompt text inviting the owner to indicate which content files are to share tags, such as the illustrated text "Content files to share tags".

The display area 370 includes file list area 320 as described above with reference to FIG. 3A. Any file name can be selected, as indicated by a radio button filled with a solid circle, or become or remain unselected, as indicated by a hollow radio button. The display area 370 includes buttons 312, 314, 316 and 318 as described above. When activated, the tag button 318 causes the tag GUI 150 to tag the selected content files with the same tags, except for content portions in fields 244 and 264.

Figure 4A:
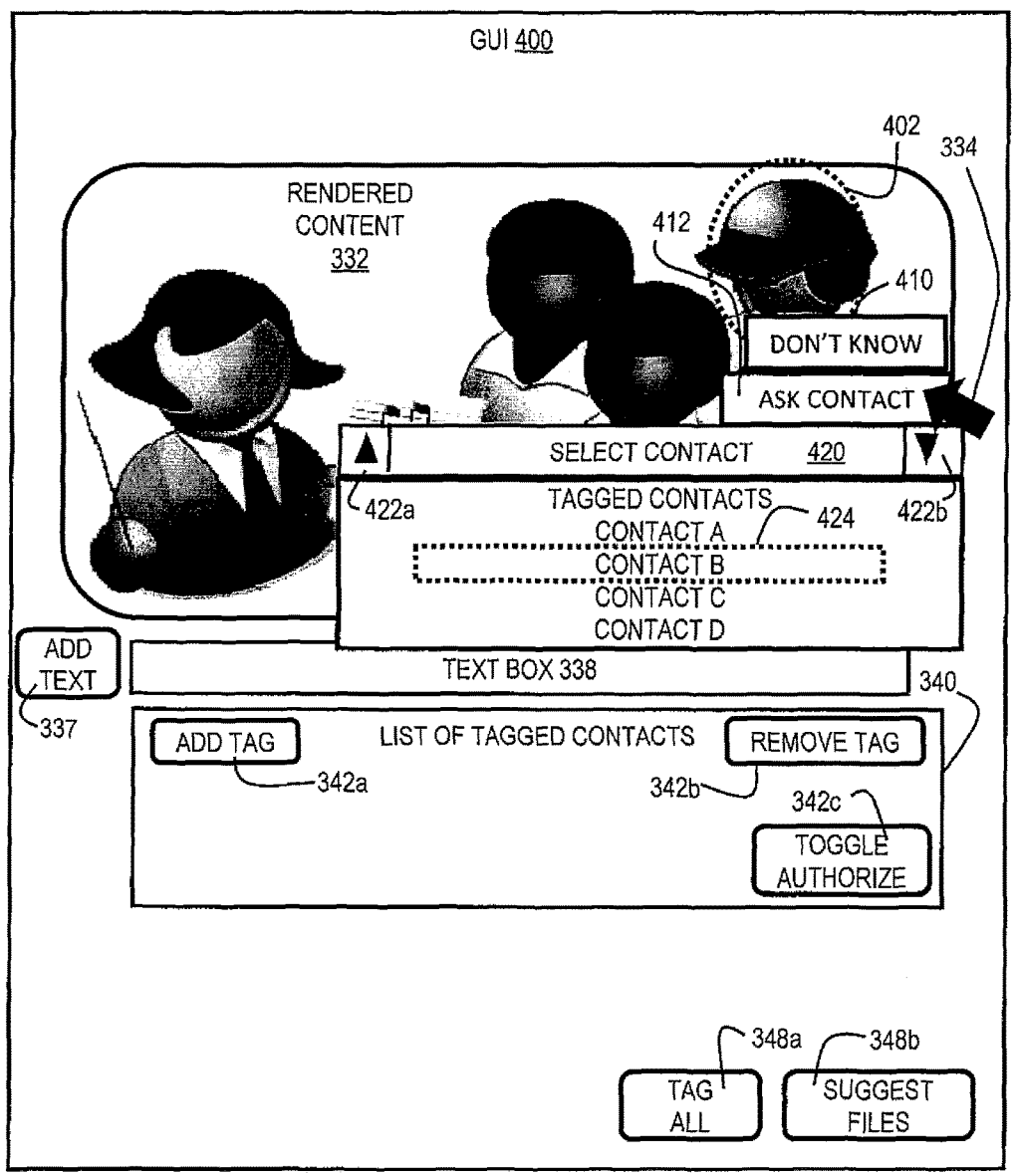
FIG. 4A is a diagram of a user interface for distributing an unknown item in content, according to an embodiment.

FIG. 4A is a diagram of a user interface 400 for distributing an unknown item in content, according to an embodiment. The GUI 400 is displayed on UE 101 by tag GUI module 150, as described above for GUI 300. The rendered content area 332, add text button 337, text box 338, contact tagging area 340 with add tag button 342a and remove tag button 342b and toggle authorize button 342c, and tag all button 348a and suggest files button 348b are as described above.

When a portion of the content has been tagged with the "don't know" value, that value appears when the cursor is placed over the corresponding portion of the rendered content area 322. For example, the value "don't know" appears in text box 410 when cursor 334 is placed in the portion 402 over the helmeted figure in the back row of the choir.

According to some embodiments, extra functionality is offered when the special "don't know" value is associated with a portion of the content. One or more contacts can be requested to provide the missing information about the item (person or thing) in the portion of the content.

For example, below the text box 410 appears another text box 412 that presents the prompting text "Ask contact." When the user slides the cursor 334 to the text box 412, as shown in FIG. 4A, a display area 420 is presented. A list of the user's contacts from which to select, e.g., from the contact list field 206 of the user profile data structure 200 or a local source on the UE 101a, is presented in the display area 420. One of the listed contacts is highlighted as indicated by the dotted rectangle 424. The highlighted area can be moved up or down on the list by using a pointing device to activate up or down control areas 422a and 422b, respectively, as is well known in the art. Note that one choice is "tagged contacts." This choice means that all the contacts already tagged for the contact, if any, will receive the request to identify the item in the portion of the content tagged with the "don't know" value.

When the highlighted tag is the correct one, the choice is accepted, e.g., by positioning the cursor 334 over the highlighted contact and pressing a button on the pointing device, or by touching the highlighted contact. A message is sent to the contact with at least the portion of the content that includes the item to be identified. In some embodiments, tag GUI module 150 on UE 101a sends the message directly to the tag GUI module 150 on UE 101b of the contact selected, or, in other embodiments, indirectly through the extended content tag sharing module 160 on social network service 120.

Figure 4B:
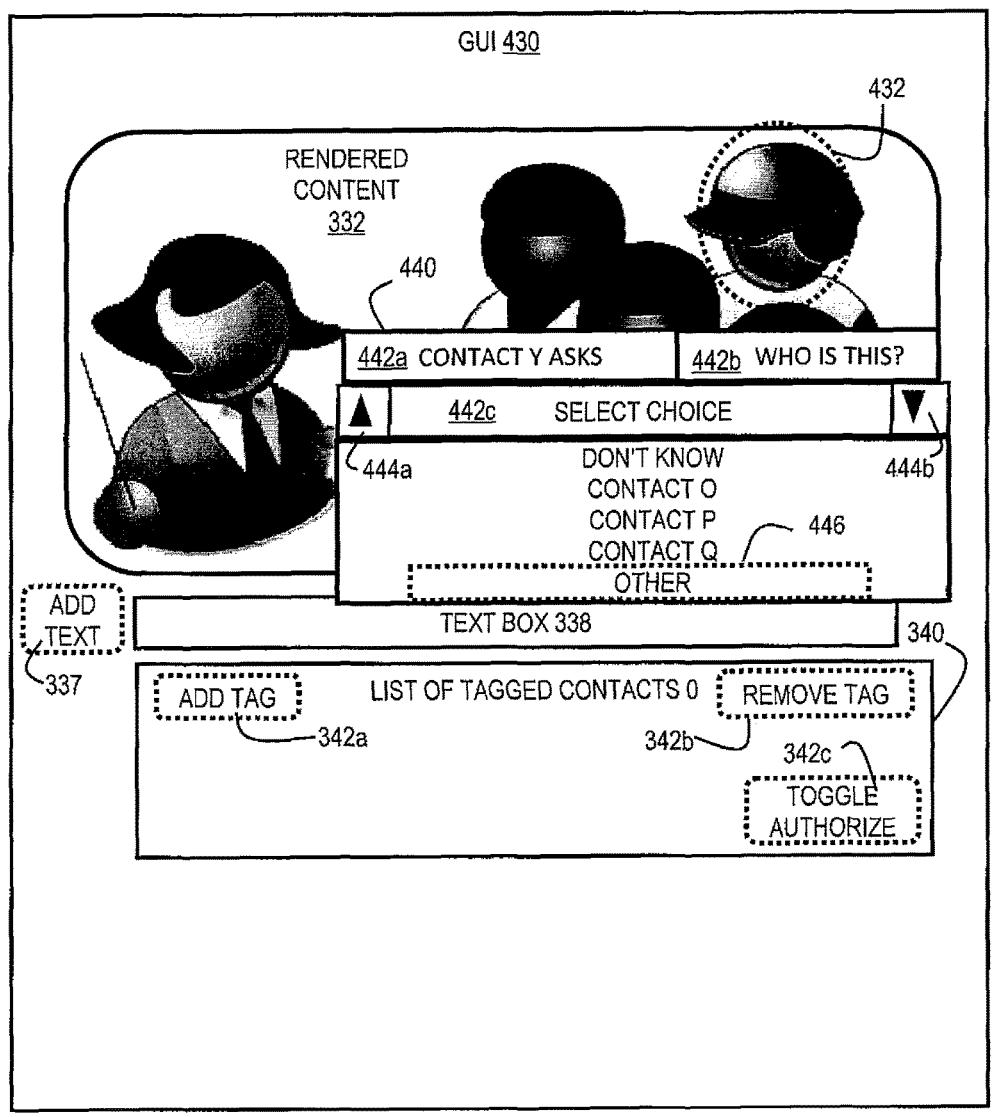
FIG. 4B is a diagram of a user interface for prompting tagging of an unknown item in content, according to an embodiment.

FIG. 4B is a diagram of a user interface 430 for prompting tagging of an unknown item in content, according to an embodiment. The GUI 430 is displayed on UE 101 by tag GUI module 150, as described above for GUI 300. The rendered content area 332, add text button 337, text box 338, contact tagging area 340 with add tag button 342a and remove tag button 342b and toggle authorize button 342c, are as described above. However, the contact that receives this message might not be authorized to tag the content. In such embodiments, the add text button 337, add tag button 342 and remove tag button 342b and toggle authorize button 342c are disabled and cannot be activated by this user. This is indicated by omitting the buttons or graying them out or otherwise indicating their disabled status. To indicate the disabled status in FIG. 4B, the buttons 337, 342a and 342b are dotted. The tag all button 348a and suggest files button 348b are omitted. Disabling GUI active areas for unauthorized user is an example means of achieving the advantage of obtaining help from a knowledgeable person who is not represented in the content or otherwise not eligible to tag the content.

The recipient of the message is prompted to identify the unknown item in the portion of the content. For example, the portion of the content is indicated by a highlighted oval 432.

In some embodiments, only the portion of the content is rendered in the rendered content area 332. Help tag display area 440 is presented, e.g., adjacent to the portion of the content with the unknown item to be identified.

The help tag display area 440 includes prompting text areas 442a, 442b and 442c. The person sending the message for help is indicated in prompting text area 442a; and the question is posed in prompting text area 44b. For example, in the illustrated embodiment, prompting text area 442a states "Contact Y asks" and prompting text area 442b states "Who is this?"

A list of the user's contacts from which to select, e.g., from the contact list field 206 of the user profile data structure 200 or a local source on the UE 101, is presented in the display area 442c. One of the listed contacts is highlighted as indicated by the dotted rectangle 446. The highlighted area can be moved up or down on the list by using a pointing device to activate up or down control areas 444a and 444b, respectively, as is well known in the art. Note that one choice is "don't know" meaning that this user cannot provide the desired answer. Note that another choice is "other" meaning that the identifier is not a contact ID.

If the user chooses "other" then the user is presented with a text box (not shown) in which the user can type text. This is useful for identifying a thing or activity in the portion of the content, or identifying a person who is known to the user but is not a social network contact of the user, such as a celebrity or casual acquaintance.

When the highlighted tag is the correct one, the choice is accepted, e.g., by positioning the cursor 334 over the highlighted contact and pressing a button on the pointing device, or by touching the highlighted contact. The next GUI depicted in FIG. 4C is then presented to the user who received the request message.

Figure 4C:
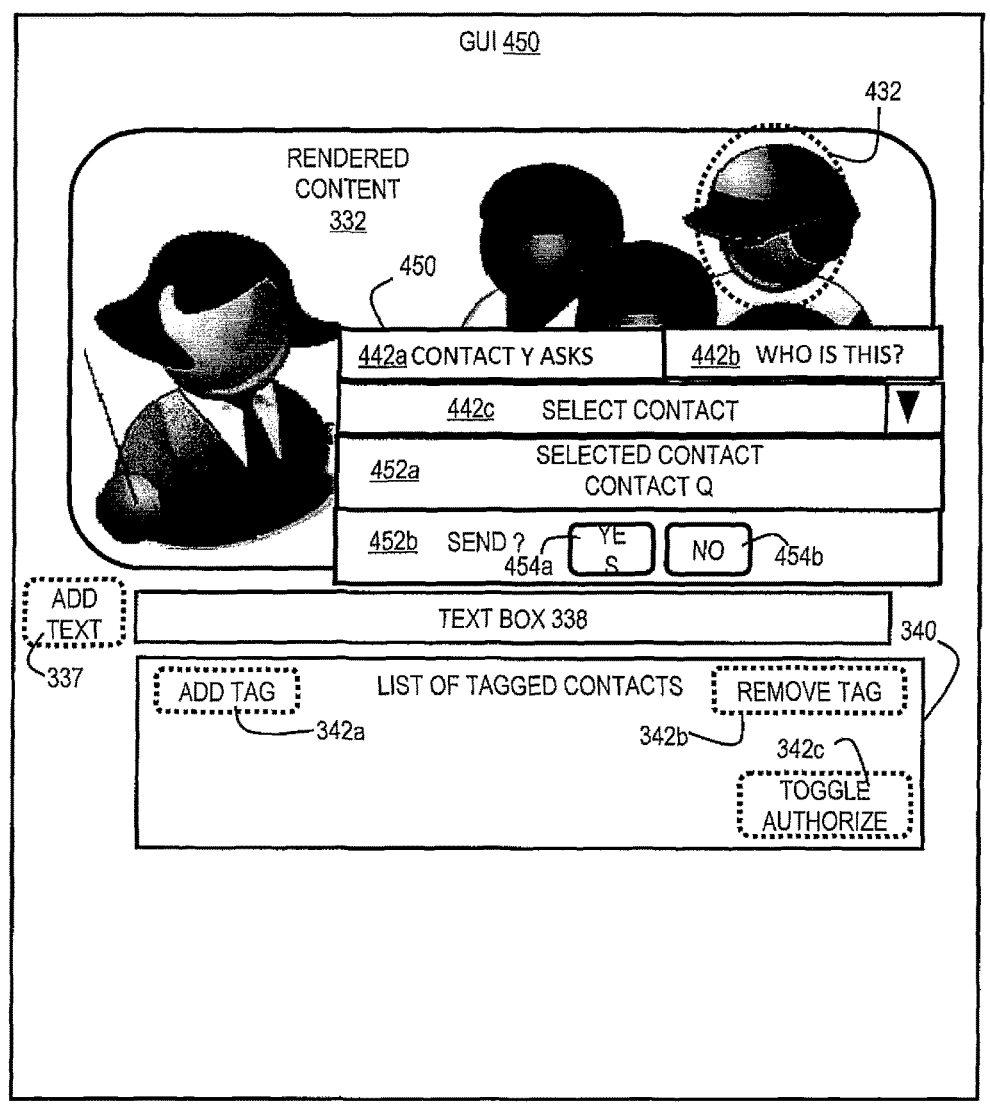
FIG. 4C is a diagram of a user interface for tagging of an unknown item in content, according to an embodiment.

FIG. 4C is a diagram of a user interface 450 for tagging of an unknown item in content, according to an embodiment. The GUI 430 is displayed on UE 101 by tag GUI module 150, as described above for GUI 300. The rendered content area 332, add text button 337, text box 338, contact tagging area 340 with add tag button 342a and remove tag button 342b and toggle authorize button 342c, are as described above for FIG. 4B. Send help display area 450 is presented, e.g., adjacent to the portion of the content with the item to be identified.

The send help display area 450 includes prompting text areas 442a, 442b and 442c, as described above for FIG. 4B. The send help display area 450 also includes prompting text areas 452a and 452b. Prompting text area 452a indicates how the user has identified the item in the portion 432 of the content. For example, in the illustrated embodiment, the prompting text area 452a indicates that the user has identified the item in the portion 432 of the content as contact Q. Prompting text area 452b asks the user whether to send the response to the requesting contact and provides a yes button 454a and a no button 454b. For example the prompting text area 452b in the illustrated embodiment asks "Send?"

If the user activates the no button 454b, then the user is returned to GUI 430 depicted in FIG. 4B. If the user activates the yes button 454a, then a message is sent to the tag GUI 150 on the UE 101a of contact Y, either directly, in some embodiments, or indirectly through the extended content tag sharing module 160 on social network service 120 in other embodiments. Thus, a user can get help tagging content without having to be in the same room with the persons who might know how to identify an unknown item. The GUI 430 and 450 are example means of achieving the advantage of obtaining tagging help for unknown items from a person not in the same room as the requesting user.

Figure 5B:
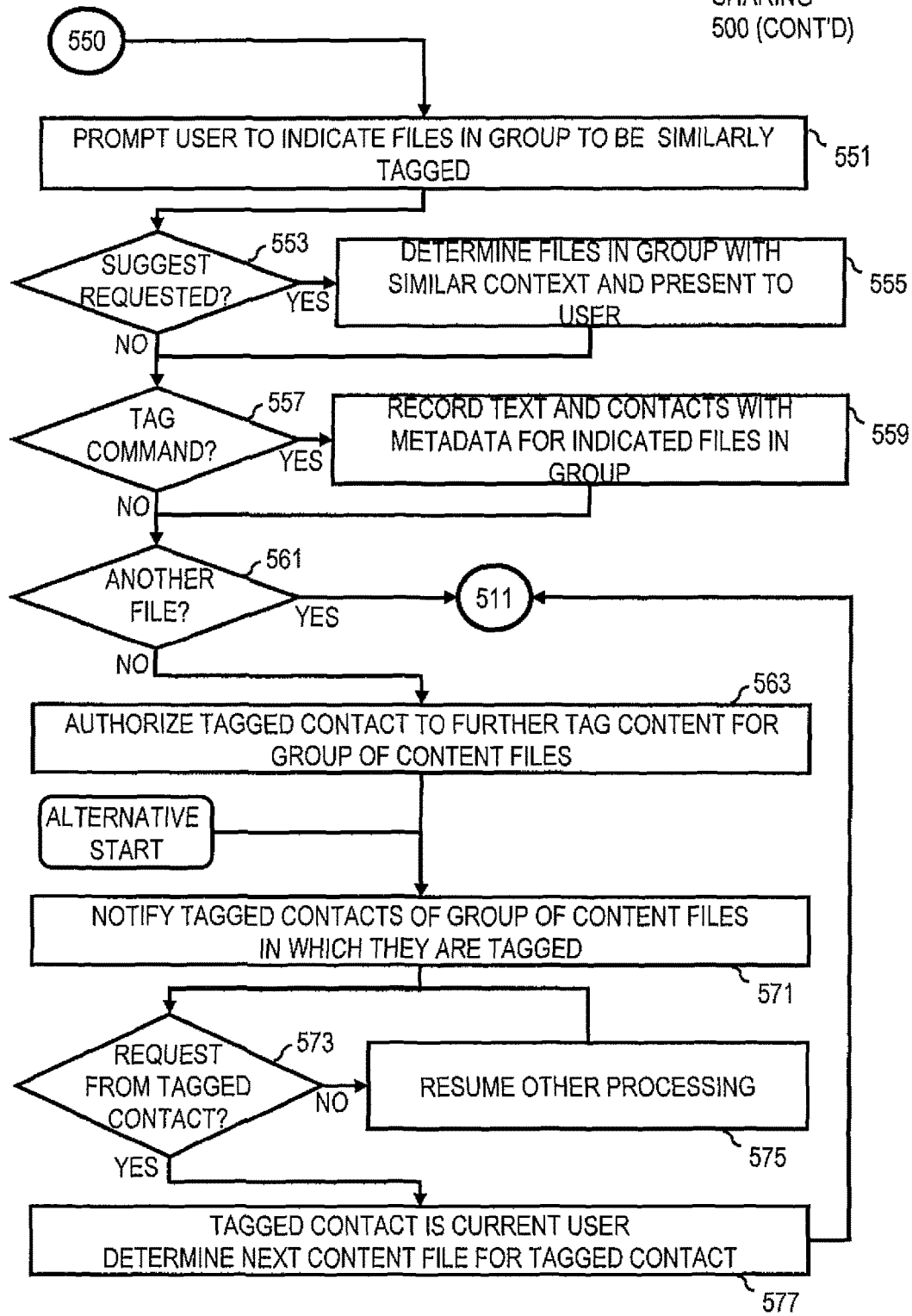

FIG. 5A and FIG. 5B comprise a flowchart of a process 500 for expanded content tag sharing, according to one embodiment. In one embodiment, the extended content tag sharing module 160 performs the process 500 using a tag GUI in a browser 107; and module 160 is implemented in, for instance, a chip set including a processor and a memory as shown FIG. 8 or computer system depicted in FIG. 7. In one embodiment, the tag GUI 150 performs the process 500 and is implemented in, for instance, a chip set including a processor and a memory as shown FIG. 8 or mobile terminal depicted in FIG. 9. In some embodiments, the steps of process 500 are distributed between the extended content tag sharing module 160 and the tag GUI module 150. To simplify the description, the process will be narrated as if the steps were performed by the module 160 on a social network service 120.

Although steps are shown in FIG. 5A and FIG. 5B, and in subsequent flow chart FIG. 6, as integral steps in a particular order for purposes of illustration, in other embodiments one or more steps, or portions thereof, are performed in a different order, or overlapping ii time, performed in series or parallel, or are omitted, or additional steps are added, or the process is changed in some combination of ways.

In step 501, a message is received that indicates a user is to share content owned by the user, such as one or more audio files, video files or image files. For example, the user issues a command on an operating system of UE 101a to cause the tag GUI module 150 to be executed and selects a tag GUI option to share photographs. As another example, the browser 107 receives user input that causes the browser to access a page on a network service 110 and selects an option presented on that page, such as an option to upload photographs to a home page of social network service 120.

In step 503 the user is prompted to indicate one or more content files and a tag option. For example, the tag GUI module 150 generates and presents GUI 300 (depicted in FIG. 3A described above), either on its own, in some embodiments, or, in other embodiments, within browser 107 in response to HTTP messages from the extended content tag sharing module 160 of the social network service 120.

In step 505, it is determined whether a response is received from the user. For example, it is determined whether the upload button 317 in GUI 300 has been activated. If not activated, other processing is resumed, such as running other applications or detecting an end process command and ending the process. After a delay, control is returned to step 505 to determine if a response to the prompt has been received. If whether a response is received from the user, control passes to step 507.

In step 507, the selected content files for sharing are recorded with metadata in one or more user content fields 210, either locally in some embodiments, or, in the illustrated embodiment, in the user profile data structure 200.

In step 509, it is determined whether a tag option has been selected by the user. For example, it is determined whether the tag button 318 in GUI 300 has been activated. If not activated, the process 500 ends. If the tag option is selected, then, in step 511 the next content file of the selected content files is rendered on the user device, e.g., in rendered content area 332 of GUI 330 described above with reference to FIG. 3B. If no other content files have yet been rendered for tagging, then the first of the selected set of content files is rendered (e.g., the file with file name 322b is rendered).

In step 513, the user is prompted to indicate a text item identifier (such as text of the name of a person who is not a contact) to be associated with the content file rendered in step 511, and any portion of the content to be associated with the text item identifier. For example, the add text button 337, text box 338, tagged contacts area 340 and content portion 335 around cursor 334 in GUI 330 are presented to the user.

In step 515, the user is prompted to indicate a contact to be associated with the content file rendered in step 511, and any portion of the content to be associated with the contact. For example, the tagged contact display area 340, with the add tag button 342a, remove tag button 342b and toggle authorize button 342c, and the select contact display area 344 in GUI 330 are presented to the user.

In step 517, it is determined whether text is received. The text or other item identifier is received into text box 338 and activation of the add button 337 is detected. In step 519 the text, and any portion of the content, is recorded in the metadata for the content file. For example, data indicating the text in the text box 338 is inserted into one of text field 236 or text field 256 in the content metadata data structure 221 for the content file. If a portion 335 of the rendered content has been selected, then data indicating that portion is included in a content portion field 237 or 257 within the text field 236 or 256, respectively.

In step 521, it is determined whether a contact is received. Contacts are added from the user's contact list (e.g., in field 206 in the user profile data structure 200) by moving the highlighted area 346 and indicating a choice, e.g., by detecting activation of the add tag button 342a. Contacts are removed from the list of tagged contacts by moving the highlighted area 346 and indicating a choice, e.g., by detecting activation of the remove tag button 342a. Contacts are changed from authorized to unauthorized for further tagging by moving a highlighted area in the list of tagged contacts area 340 and detecting activation of the toggle authorize button 342c. In step 523 the contact, and any authorization data, and any portion of the content, is recorded in the metadata for the content file, e.g., in tagged contact fields 240 or 260.

Thus step 521 determines that data that indicates a contact (a first user) is associated on an apparatus with a content identifier that indicates content provided by the owner (a different second user). Step 523 causes, at least in part, actions that result in recording, on the apparatus, authorization data that indicates the contact (first user) is authorized to associate on the apparatus a different third user with the content identifier, without further input by the second user. Because in some embodiments the text or contact is stored with portion data in field 244 or 264 indicating a portion of the content, steps 519 and 523 cause, at least in part, actions that result in associating on the local or remote apparatus the item identifier that indicates the identifier (text or contact) with portion data that indicates the portion of the content. The item identifier is at least one of data that identifies the new contact (third user) or text that describes the portion of the content that is rendered.

In step 525 it is determined if neither text nor contacts have been received. Any method may be used to determine that neither text nor contacts have been received, e.g., after a given time without input, or upon the user pressing the tag all button 348a or suggest files button 348b without having entered data in text box 338 or tagged contacts display area 340. If neither, then no tagging has been done and control passes to step 561 to get the next content file in the group to be uploaded, as described in more detail below. After step 523, or after it is determined in step 525 that at least text has been received, control passes to step 527.

In step 527, it is determined whether an item has been tagged as an unknown, e.g., an unknown contact. If so, then in step 529 the user is prompted to send at least a portion 402 of the content associated with the unknown tag to a known contact. For example, the tag GUI module 150 generates and presents the text box 412 of GUI 400 (depicted in FIG. 4A described above), either on its own, in some embodiments, or, in other embodiments, within browser 107 in response to HTTP messages from the extended content tag sharing module 160 of the social network service 120. Step 529 includes determining the user selection of a contact from whom to request an identifier for the unknown item. For example, the user selection of contact B in highlighted area 424 is detected when the user positions the cursor in the select contact display area 420. In some embodiments, the default contact from whom to request an identifier for the unknown item is every contact already included in the tagged contacts display area 340, represented by the "tagged contacts" choice in select contact display area 420.

Step 529 includes sending a message that indicates the portion 402 and the user to the selected contact, prompting the selected contact to respond as described below with reference to a process depicted in FIG. 6 and described in more detail below. For example, during step 529 the tag GUI module 150 on UE 101a sends a message to the tag GUI module 150 on UE 101b, either directly or indirectly through the extended content tag sharing module 160 in social network service 120. The tag GUI module 150 on UE 101b prompts the user of UE 101b to identify the unknown item, e.g., by displaying GUI 430 depicted in FIG. 4B, described above, and GUI 450 depicted in FIG. 4C, described above.

In step 531, it is determined whether an identifier for the unknown item or items have been provided, e.g., in a message received at tag GUI module 150 on UE 101a from the tag GUI module 150 on UE 101b, either directly or through the extended content tag sharing module 160 in social network service 120. For example, a message is received from selected contact B that indicates the person in portion 402 is contact Q (possibly a contact of the selected contact 13 and not a contact of the user of UE 101a). If so, then, in step 533, the identifier for the unknown item is recorded with the metadata for the content, e.g., in the text field 236 or 258 for an identifier that is not a subscriber of the social network or a contact of the user, or in the tagged contact field 240 or 260. In some embodiments, the portion 402 of the content is indicated by data stored in the content portion field 244 or 264.

After step 533, or if it is determined in step 531 that an identifier is not provided for an unknown item, control passes to steps after connector 550, depicted in FIG. 5B.

In step 551, the user is prompted to indicate, among the group of content files to be shared, which contents are to share tags. Thus, the content identifier that indicates the content provided by the owner (second user) further comprises data that indicates a plurality of contents provided by the second user. For example, the tag GUI module 150 generates and presents GUI 350 (depicted in FIG. 3C described above), either on its own, in some embodiments, or, in other embodiments, within browser 107 in response to HTTP messages from the extended content tag sharing module 160 of the social network service 120. GUI 350 includes the tag all button 348a and the suggest files button 348b. When the user is finished tagging the current content file with text or one or more contacts of the user, the user activates the tag all button 348a or the suggest files button. The tag GUI module 150 detects the user's selection and presents the next GUI, either on its own or in response to HTTP messages exchanged with the extended content tag sharing module 160 of the social network service 120. For example, the tag GUI module 150 on UE 101*a* presents GUI 360 depicted in FIG. 360 and described above.

The GUI 360 includes a display area 370 where a user can determine content files on the UE 101 to share current tags. The display area 370 includes prompt text inviting the owner to indicate which content files are to share tags, such as the illustrated text "Content files to share tags". The display area 370 includes file list area 320 (with file name areas 322*a* through 322*e*, scroll bar 326 and radio buttons 324) and buttons 312, 314, 316, and 318 as described above with reference to GUI 300 in FIG. 3A.

In step 553, it is determined whether the user has requested a suggestion for which files to share tags. For example, it is determined whether the suggest files button 348*b* has been activated. If so, then in step 555 the content files within the group being uploaded are examined to automatically determine which content files are likely to be relevant to the tags just added to the current content. Any method may be used to determine the relevant content files. For example, in some embodiments, content files are suggested that were generated within a limited time window or within a limited spatial area, or some combination, based on the data in metadata field 226. In some embodiments, only content files of the same type (image or audio or video or game data or other data) are suggested. In other embodiments, content files of one or more different types are also suggested. In some embodiments, content files outside the group selected for upload are suggested, such as content files of a different type, or content files owned by one of the tagged contacts or a contact that belongs to one or more of the same groups of the user and generated in the same time and space window as the tagged file. The selected or suggested files are indicated in GUI 360 by the filled radio buttons (e.g., the buttons for content files with file name 322*b*, 322*c* and 322*e*). Thus, in step 555, on the local apparatus UE 101 or remote apparatus hosting social network service 120, the plurality of contents provided by the owner (second user) are determined based on context data associated with each content of the plurality of contents.

In step 557, it is determined whether the user has issued a tag command. For example, it is determined whether the tag button 318 has been activated. If so, then in step 559, the metadata for the current content file are shared with the metadata for the other content files indicated. For example, any data in the tag fields of the metadata for the current content are copied into corresponding fields of the metadata for the selected content files. In some embodiments, the sharing is both ways; and, any data in tag fields already in the metadata for any selected content file but not in the metadata for the current content file are added to the metadata for the current content file and to the metadata for any other selected content files that are missing the data in a corresponding tag field. In these embodiments, the tag field metadata is uniform across all the selected content files.

In step 561, it is determined whether there is another file in the group to be uploaded to tag, such as a content file in the group that was not selected after prompting in step 551. In some embodiments, the next file includes the next content file not already viewed, even if tagged uniformly with a previously viewed content file. If so, then control passes back to step 511 and following to process the next content file in the group. If there are no other content files in the group, control passes to step 563.

In step 563, the tagged contacts are authorized to further tag content for the group of content files to be shared. For example, in some embodiments all tagged contacts in the metadata for a content file are automatically authorized to further tag the content file. In some embodiments only tagged contacts in the metadata for a content file with the authorized contact flag field 241 or 261 set to a particular value are authorized to further tag the content file. In some embodiments, authorization is toggled during step 563 using the toggle authorize button 432*c* in GUI 350 depicted in FIG. 3C described above.

In step 571, the tagged contacts are notified that they have been tagged in a group of content files. For example, messages are sent to tag GUI module 150 on UE 101*b* that the user of UE 101*b* has been tagged in metadata 134 for content 132, either directly by tag GUI module 150 on UE 101*a*, in some embodiments, or indirectly through extended content tag sharing module 160 in social network service 120, in other embodiments.

In some embodiments, step 571 represents the first step of the process 500. For example, the tag GUI module 150 on UE 101*b* starts in step 571 by presenting GUI 350 to the user of UE 101*b* upon notification that the user of UE 101*b* is tagged in the content 132, and presents content 132 in the rendered content area 332. The tagged contact sees all the tagged contacts in display area 340, including himself or herself. The user of UE 101*b* sees the text for the content in field 338 and any text or contacts for individual portions of the content by moving the cursor 334 around the rendered content area 332.

In step 573, it is determined whether the tagged contact is requesting to tag the content further. If not, then in step 575 other processing is done by the tag GUI, in some embodiments; or by the extended content tag sharing module 160 in social network service 120, in other embodiments.

If the tagged contact is requesting to tag the content further, then in step 577, the tagged contact is considered the current user, unless the tagged contact is determined to be not authorized to further tag the content based on a particular value in the authorized contact flag field 241 or 261. The next content file to be tagged by the tagged contact is determined, e.g., the first content file in the group that shares tags that include the tagged contact. Control then passes back to step 511 to present the content and prompts, as described above to the authorized contact, who is not the owner of the content.

Thus the method causes, at least in part, actions that result in rendering at least a portion of the content on user apparatus of the contact (first user) during the next pass through step 511 and prompting the contact (first user) for associating with the portion of the content, an identifier, such as text or another contact ID during the next pass through step 513 and step 515. If the user apparatus, e.g., tag GUI module 150 on UE 101*b*, receives an item identifier that indicates the identifier (e.g., in step 517 or step 521), then the process 500 causes, at least in part, actions that result in associating on the apparatus the item identifier with the content identifier that indicates the content in either step 519 or step 523. Furthermore, if the user apparatus (e.g., UE 101*a*) receives portion data that indicates the different portion of the content, and the receives the contact, then the method causes in step 513 and 515, at least in part, actions that result in rendering the different portion on an apparatus of the contact (e.g., on UE 101*b*), and prompting the contact for associating, with the different portion of the content, an item identifier for the different portion of the content.

When step 529 to deal with an unknown item is repeated for an authorized contact who is not the owner, the method causes, at least in part, actions that result in prompting the contact (first user) for associating with a different portion of the content a new contact to whom to send the different portion of the content.

FIG. 6 is a flowchart of a process 600 for sharing the tagging of an unknown item, according to one embodiment. In one embodiment, the extended content tag sharing module 160 performs the process 5600 using a tag GUI module 150 in a browser 107; and module 160 is implemented in, for instance, a chip set including a processor and a memory as shown FIG. 8 or computer system depicted in FIG. 7. In one embodiment, the tag GUI module 150 performs the process 600 and is implemented in, for instance, a chip set including a processor and a memory as shown FIG. 8 or mobile terminal depicted in FIG. 9. In some embodiments steps are distributed between the modules 150 and 160. To simplify the description, the process will be narrated as if the steps were performed by the module 160 on a social network service 120.

In step 601 a request is received from a contact of the user to identify an unknown item in some content generated by the contact. For example, tag GUI module 150 on UE 101b of contact B receives the message sent by the tag GUI module 150 on UE 101a of contact Y during step 529, described above, as a result of the prompt depicted in GUI 400 of FIG. 4A. Thus step 601 determines, on an apparatus (e.g., UE 101b), a message is received from an apparatus of a first user (e.g., UE 101a), wherein the message comprises portion data that indicates a portion of content associated with the first user and data that indicates a second user (user of UE 101b).

In step 603 the content indicated in the message and corresponding metadata is downloaded to the local device, e.g., either directly from tag GUI module 150 on UE 101a, in some embodiments, or indirectly from user profile data structure 122 through extended content tag sharing module 160 in social network service 120, in other embodiments. The metadata includes a field 244 or 264 that holds portion data that indicates a portion of the content and a contact ID field 242 or 262, respectively, that holds a value indicating that an item is unknown.

In step 605 the content is rendered on the user device. In step 607, the user is prompted to identify the unknown item in an associated portion of the content. For example, the tag GUI module 150 on UE 101b presents GUI 430 with the content rendered in the rendered content area 332 and prompts presented in display area 440 adjacent to the portion 432 of the content with the unknown item. In some embodiments, only the portion 432 is rendered in the area 332; and, in some of these embodiments, the portion 432 is expanded in size within area 332 to better draw the user's attention. Thus, in some embodiments, the portion of the content rendered on the user apparatus of the contact (first user) is a portion that is less than all the content. Because the portion was indicated in the metadata provided by a different user and downloaded during step 605, the portion of the content rendered on the user apparatus of the contact (first user) is determined based on input from a user different from the first user.

Thus, steps 605 and 607 cause, at least in part, actions that result in rendering the portion of the content on an apparatus of the second user, and prompting the second user for associating, with the portion data that indicates the portion of the content, an item identifier that indicates an identifier for the portion of the content.

The display area 440 includes prompt fields 442a, 442b and 442c. The appropriate response is selected from the list of choices in area 442c, including "don't know", one or more contacts of the user, e.g., from the user's contact list, either local or in the user's profile 122 on the social network service 120, or "other." The response "other" indicates that text will be entered in text box 338 and causes the tag GUI module 150 to enable the add text button 337 and text box 338.

In step 611, it is determined whether text is received, e.g. whether the user has selected other and entered text in the text box 338. The text or other item identifier is received into text box 338 and activation of the add button 337 is detected. In step 613, the text is associated with the portion 432 of the content.

In step 615, it is determined whether a contact is received. Contacts are added from the user's contact list (e.g., in field 206 in the user profile data structure 200) by moving the highlighted area 446 and indicating a choice, e.g., by detecting the pressing of a key or screen area on a pointing device. In step 617, the contact is associated with the portion 432 of the content.

Thus in step 613 or in step 617, the identifier for the different portion of the content is at least one of data that identifies the new contact (third user) or text that describes the different portion of the content that is rendered on the apparatus of the current contact.

In step 621 it is determined if neither text nor contacts have been received. Any method may be used to determine that neither text nor contacts have been received, e.g., after a given time without input, or upon the user selecting the "don't know" choice. If neither text nor contacts are received, then no identifying has been done and the process ends. In some embodiments, a "don't know" response message is sent to the tag GUI module 150 of UE 101a. After step 617 or after it is determined in step 621 that at least text has been received, control passes to step 623.

In step 623 the identifier for the unknown item is sent to the authorized user. For example, GUI 450 depicted in FIG. 4C described above, is presented to the requested contact. Upon detecting activation of the yes button 454a, a message is sent to the user (e.g., contact Y) who is authorized to tag the content. Thus, if the apparatus of the second user (e.g., UE 101b) receives portion data that indicates the identifier for the portion of the content, then causing, at least in part, actions that result in sending the item identifier that indicates the identifier to the apparatus of the first user (e.g., UE 101a).

In step 625 the metadata for the content is updated with an identifier provided by the requested contact (e.g., identifier "contact Q" provided by contact B). The suggested tag is presented to the authorized user, e.g., in GUI 350 depicted in FIG. 3C, described above. The authorized user sees the response (e.g., contact Q) in the list of tagged contacts area 340. If the authorized user moves the cursor 334 over the helmeted figure, the tag "Contact Q" will be displayed in a text box 352 instead of "don't know." If text is provided instead of a contact, then the text is presented in the text box 352. For example, the text box will present the text "Sport star X" who is not a contact of the authorized user or of the requested contact (e.g., contact B). The authorized user can then accept the tag or remove it, as described above.

The processes described herein for providing expanded content tag sharing may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
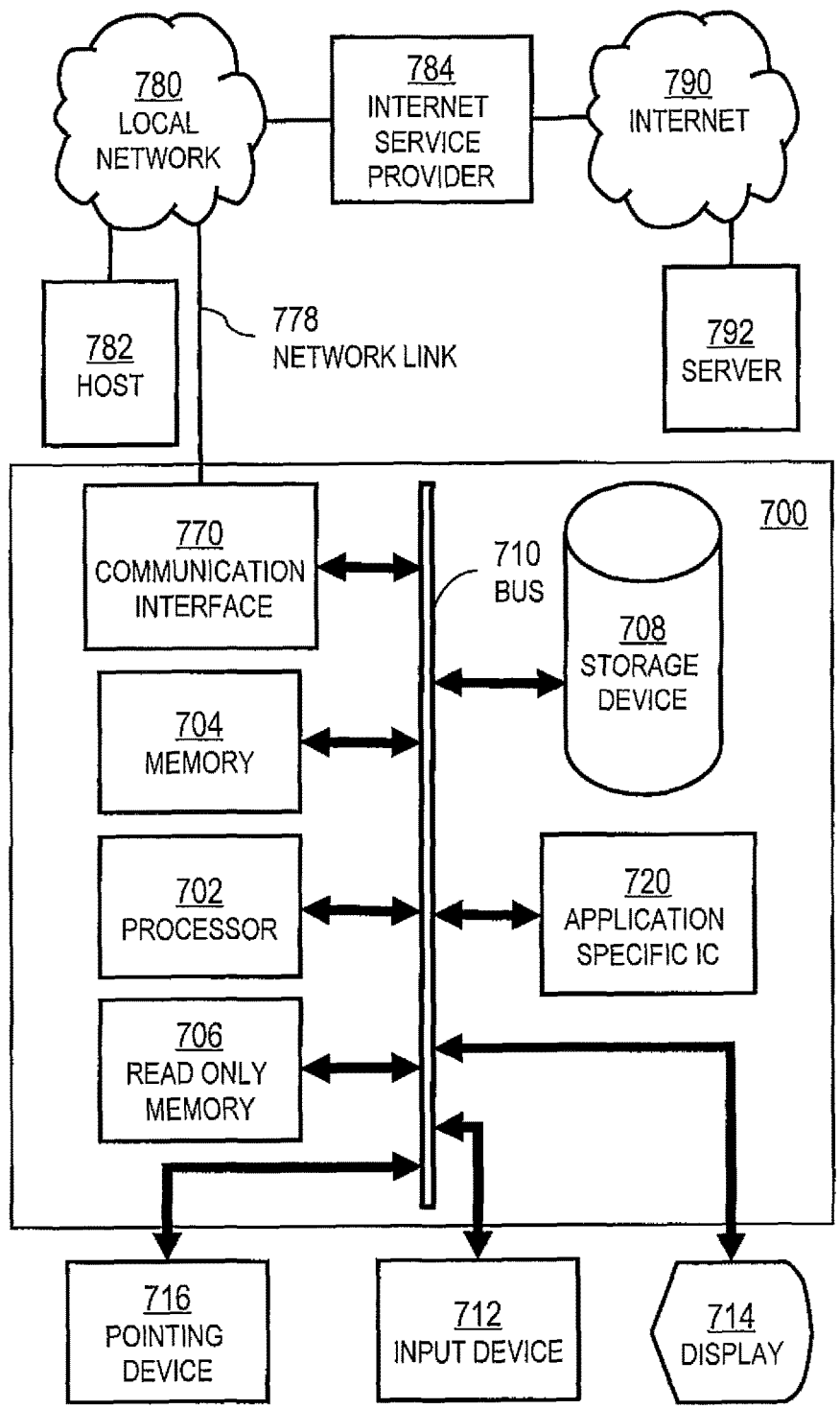
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to expand content tag sharing as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of expanded content tag sharing.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to expanded content tag sharing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be, performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for expanded content tag sharing. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for expanded content tag sharing, is provided to the bus 710 for use by the processor from an external input device 712, such as a keyboard containing alphanumeric keys operated by a human user, or a sensor, A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for expanded content tag sharing with the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider PP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
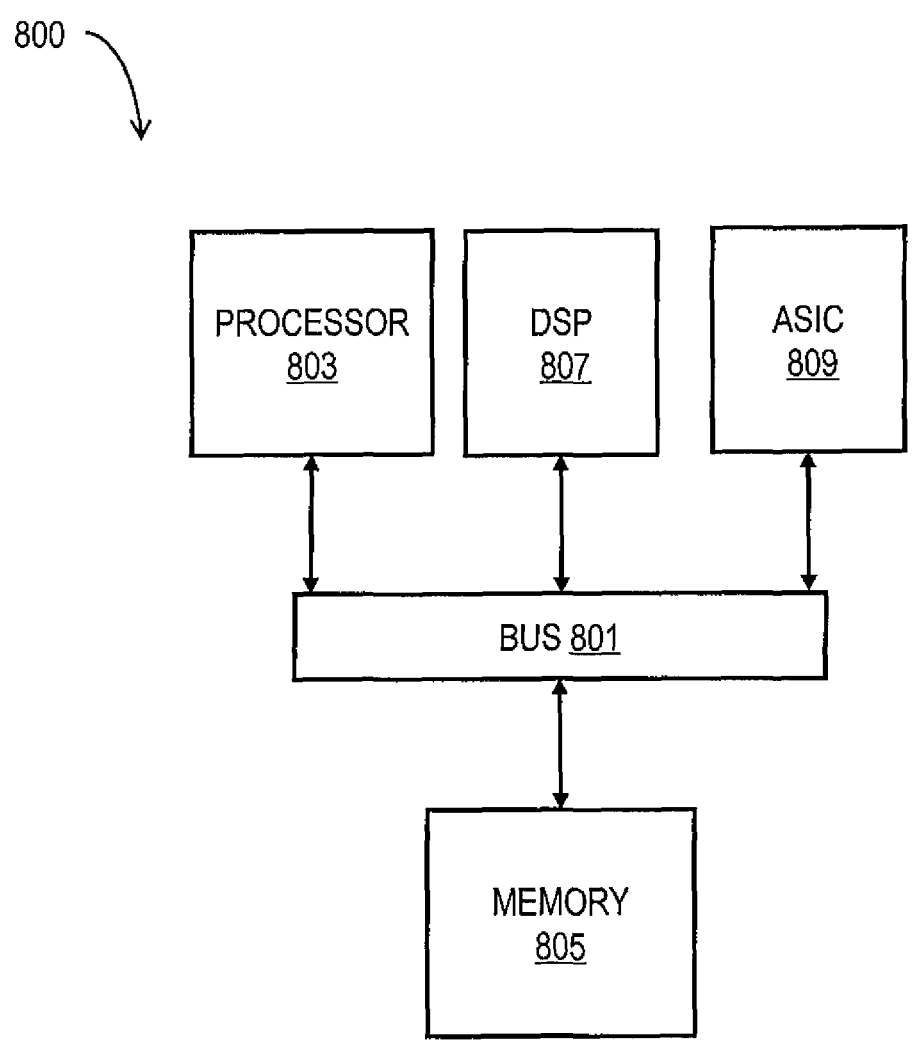
FIG. 8 is a diagram of a chip set that can be used to implement an embodiment of the invention.

FIG. 8 illustrates a chip set or chip 800 upon which an embodiment of the invention may be implemented. Chip set 800 is programmed to expand content tag sharing as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services. Chip set or chip 800, or a portion thereof, constitutes a means for performing one or more steps of expanded content tag sharing.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to expand content tag sharing. The memory 805 also stores the data associated with or generated by the execution of the inventive steps.

Figure 9:
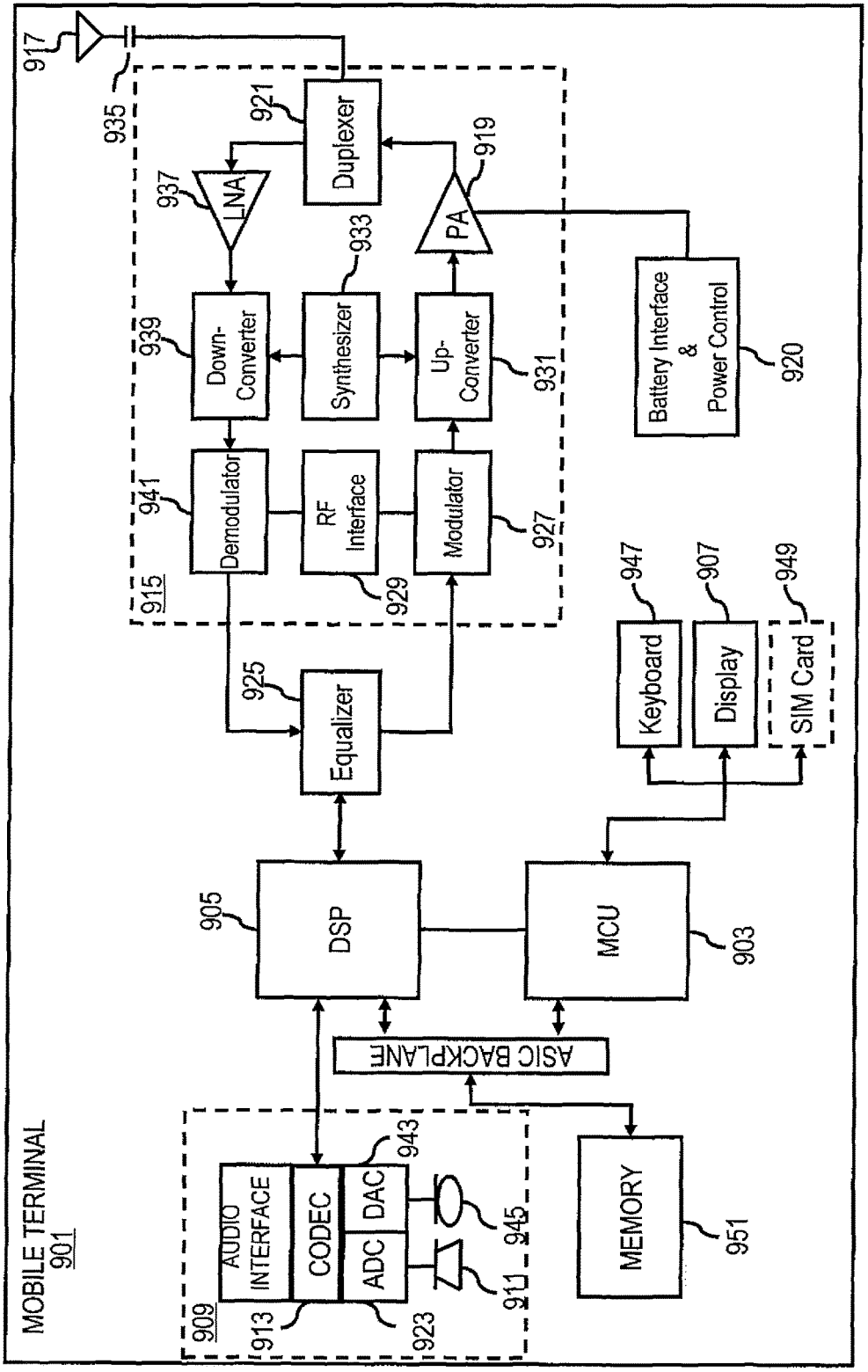
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of expanded content tag sharing. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of expanded content tag sharing. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for, processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to expand content tag sharing. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method of expanding content tag sharing, the method comprising:
   associating, utilizing at least one processor, a plurality of data fields with a content associated with a first person, wherein the data fields include a content identifier field configured to hold a content identifier of the content, a tagged contact field configured to hold authorized contact data indicating one or more contacts of the first person are authorized to further tag one or more unidentified items presented in one or more portions in the content, and wherein the one or more contacts are different from the first person and the one or more unidentified items;
   initiating a presentation of the content on one or more user interfaces to the one or more contacts; and
   receiving, via the one or more user interfaces, one or more item identifiers tagged to the one or more unidentified items by the one or more contacts.

2. The method of claim 1, further comprising:
   storing the one or more portions in the content tagged with the one or more item identifiers in the data fields, wherein the one or more contacts are presented in the one or more portions in the content and tagged with one or more contact identifiers by the first user.

3. The method of claim 1, wherein the content identifier further indicates a plurality of contents provided by the first user, the method further comprising determining the plurality of contents provided by the first user based on context data associated with each content of the plurality of contents.

4. The method of claim 3, wherein the at least one processor is embedded in an apparatus of a network service, the one or more user interfaces are provided on one or more user devices associated with the one or more contacts of the first person, and the one or more unidentified items include one or more people, one or more objects, or a combination thereof.

5. The method of claim 1, further comprising:
   initiating one or more prompts in the one or more user interfaces for the one or more contacts of the first person to tag one or more other portions in the content with one or more other item identifiers.

6. The method of claim 5, wherein each of the one or more portions in the content rendered on the one or more user interfaces is less than the content.

7. The method of claim 1, further comprising:
   initiating at least one prompt in at least one of the user interfaces for at least one of the one or more contacts of the first person to authorize an extended contact of the first person to further tag at least one remaining unidentified item presented in at least one other portion in the content, wherein the extended contact of the first person is a contact of at least one of the one or more contacts of the first person but not a contact of the first person.

8. The method of claim 7, further comprising:
initiating a presentation of the content on another user interface to the extended contact.

9. The method of claim 8, further comprising:
receiving, via the another user interface, at least one other item identifier tagged to the at least one remaining unidentified item by the extended contact.

10. The method of claim 9, wherein the at least one item identifier identifies the at least one remaining unidentified item or text that describes the at least one other portion of the content that is rendered.

11. The method of claim 1, wherein each of the item identifiers is at least one of data that identifies a respective one of the unidentified items or text that describes a respective one of the one or more portions of the content that is rendered.

12. An apparatus configured to expand content tag sharing, the apparatus comprising:
at least one processor; and
at least one memory including computer program code, the at least one memory and the computer program code configured to, with the at least one processor, cause the apparatus to perform at least the following,
associate a plurality of data fields with a content associated with a first person, wherein the data fields include a content identifier field configured to hold a content identifier of the content, a tagged contact field configured to hold authorized contact data indicating one or more contacts of the first person are authorized to further tag one or more unidentified items presented in one or more portions in the content, and wherein the one or more contacts are different from the first person and the one or more unidentified items;
initiate a presentation of the content on one or more user interfaces to the one or more contacts; and
receive, via the one or more user interfaces, one or more item identifiers tagged to the one or more unidentified items by the one or more contacts.

13. The apparatus of claim 12, wherein the apparatus is further caused to:
store the one or more portions in the content tagged with the one or more item identifiers in the data fields, wherein the one or more contacts are presented in the one or more portions in the content and tagged with one or more contact identifiers by the first user.

14. The apparatus of claim 12, wherein the content identifier further indicates a plurality of contents provided by the first user, the method further comprising determining the plurality of contents provided by the first user based on context data associated with each content of the plurality of contents.

15. The apparatus of claim 12, wherein the apparatus is further caused to:
initiate at least one prompt in at least one of the user interfaces for at least one of the one or more contacts of the first person to authorize an extended contact of the first person to further tag at least one remaining unidentified item presented in at least one other portion in the content, wherein the extended contact of the first person is a contact of at least one of the one or more contacts of the first person but not a contact of the first person.

16. A non-transitory computer-readable storage medium carrying one or more sequences of one or more instructions which, when executed by one or more processors, cause an apparatus to at least perform the following steps to expand content tag sharing:
associating a plurality of data fields with a content associated with a first person, wherein the data fields include a content identifier field configured to hold a content identifier of the content, a tagged contact field configured to hold authorized contact data indicating one or more contacts of the first person are authorized to further tag one or more unidentified items presented in one or more portions in the content, and wherein the one or more contacts are different from the first person and the one or more unidentified items;
initiating a presentation of the content on one or more user interfaces to the one or more contacts; and
receiving, via the one or more user interfaces, one or more item identifiers tagged to the one or more unidentified items by the one or more contacts.

17. The non-transitory computer-readable storage medium of claim 16, wherein the apparatus is caused to further perform:
storing the one or more portions in the content tagged with the one or more item identifiers in the data fields, wherein the one or more contacts are presented in the one or more portions in the content and tagged with one or more contact identifiers by the first user.

18. The non-transitory computer-readable storage medium of claim 16, wherein the content identifier further indicates a plurality of contents provided by the first user, the method further comprising determining the plurality of contents provided by the first user based on context data associated with each content of the plurality of contents.

19. The non-transitory computer-readable storage medium of claim 16, wherein the apparatus is caused to further perform:
initiating at least one prompt in at least one of the user interfaces for at least one of the one or more contacts of the first person to authorize an extended contact of the first person to further tag at least one remaining unidentified item presented in at least one other portion in the content, wherein the extended contact of the first person is a contact of at least one of the one or more contacts of the first person but not a contact of the first person.

* * * * *